United States Patent
Terao et al.

(10) Patent No.: US 7,172,194 B2
(45) Date of Patent: Feb. 6, 2007

(54) PUSH FEED ARM FOR POST PROCESSING DEVICE

(75) Inventors: Yasunobu Terao, Tagata-gun (JP); Yoshiaki Sugizaki, Sunto-gun (JP); Tomomi Iijima, Mishima (JP); Tokihiko Ise, Tagata-gun (JP); Hiroyuki Taki, Tagata-gun (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/008,350

(22) Filed: Dec. 10, 2004

(65) Prior Publication Data

US 2006/0066831 A1    Mar. 30, 2006

(30) Foreign Application Priority Data

Sep. 28, 2004   (JP) ............... 2004-281780

(51) Int. Cl.
*B65H 39/00*  (2006.01)
*B65H 29/26*  (2006.01)

(52) U.S. Cl. ............ 271/190; 270/58.08; 270/58.11; 270/58.12; 270/58.14; 270/58.18; 271/189; 271/191; 271/192; 399/410

(58) Field of Classification Search .......... 270/58.08, 270/58.11, 58.12, 58.14, 58.18; 271/189, 271/190, 191, 192; 399/410
See application file for complete search history.

(56) References Cited

U.S. PATENT DOCUMENTS

| | | | |
|---|---|---|---|
| 4,473,425 A | 9/1984 | Baughman et al. | |
| 4,611,741 A | 9/1986 | Wilson | |
| 4,794,859 A | 1/1989 | Huseby et al. | |
| 4,898,374 A | 2/1990 | Vermaat | |
| 5,021,837 A | 6/1991 | Uto et al. | |
| 5,098,074 A | 3/1992 | Mandel et al. | |
| 5,282,611 A | 2/1994 | Ueda et al. | |

(Continued)

FOREIGN PATENT DOCUMENTS

JP    62-008965 A    1/1987

(Continued)

OTHER PUBLICATIONS

Y. Terao et al., U.S. PTO Office Action, U.S. Appl. No. 11/008,122, filed Nov. 21, 2005, 9 pages.

(Continued)

*Primary Examiner*—Gene O. Crawford
*Assistant Examiner*—Leslie A. Nicholson, III
(74) *Attorney, Agent, or Firm*—Foley & Lardner LLP

(57) ABSTRACT

A processing tray comprises a transport belt which transports a sheet, and a push feed arm mounted to be projected onto a surface on a sheet transport side of the belt, the arm retaining a sheet distal end so that the sheet distal end can be pushed and fed, wherein the transport belt forms a through hole through which the push feed arm penetrates, and the push feed arm comprises a push feed face which pushes and feeds the sheet distal end, a penetrating projection portion which reaches a transport belt lower face from the push feed face through the through hole, and a hook shaped engagingly lock portion engagingly locked on the belt lower face after being bent from the penetrating projection portion to the transport belt traveling direction.

9 Claims, 15 Drawing Sheets

U.S. PATENT DOCUMENTS

| | | | |
|---|---|---|---|
| 5,285,249 | A | 2/1994 | Mahoney |
| 5,289,251 | A | 2/1994 | Mandel et al. |
| 5,435,544 | A | 7/1995 | Mandel |
| 5,451,037 | A | 9/1995 | Lundstrom |
| 5,628,502 | A | 5/1997 | Amarakoon |
| 5,676,517 | A | 10/1997 | Lotz |
| 5,709,376 | A | 1/1998 | Ushirogata |
| 5,934,140 | A | 8/1999 | Jackson et al. |
| 5,961,274 | A | 10/1999 | Bors |
| 5,971,384 | A | 10/1999 | Asao |
| 6,065,747 | A | 5/2000 | Khovaylo et al. |
| 6,092,948 | A | 7/2000 | Altfather |
| 6,142,461 | A | 11/2000 | Asao et al. |
| 6,231,039 | B1 | 5/2001 | Chung |
| 6,330,999 | B2 | 12/2001 | Coombs et al. |
| 6,336,630 | B1 | 1/2002 | Holtman et al. |
| 6,354,059 | B1 * | 3/2002 | Yoshie et al. ........... 53/117 |
| 6,357,753 | B1 | 3/2002 | Yamasaki et al. |
| 6,450,934 | B1 | 9/2002 | Coombs |
| 6,581,922 | B2 | 6/2003 | Kuwata et al. |
| 6,641,129 | B2 | 11/2003 | Ogita et al. |
| 6,659,455 | B2 | 12/2003 | Endo et al. |
| 6,671,492 | B2 | 12/2003 | Mimura et al. |
| 6,698,744 | B2 | 3/2004 | Yamada et al. |
| 6,712,349 | B2 | 3/2004 | Watanabe |
| 6,722,646 | B2 | 4/2004 | Sekiyama et al. |
| 6,722,650 | B1 | 4/2004 | Abbata et al. |
| 6,733,006 | B2 | 5/2004 | Kobayashi et al. |
| 6,733,007 | B2 | 5/2004 | Sekiyama et al. |
| 6,767,012 | B2 | 7/2004 | Sasamoto |
| 6,819,906 | B1 | 11/2004 | Herrmann et al. |
| 6,824,128 | B2 | 11/2004 | Nagata et al. |
| 6,871,042 | B2 | 3/2005 | Nemura et al. |
| 6,910,686 | B2 | 6/2005 | Awano |
| 6,928,259 | B2 | 8/2005 | Sakuma |
| 6,988,728 | B2 | 1/2006 | Kida |
| 2002/0047233 | A1 | 4/2002 | Coombs et al. |
| 2002/0163119 | A1 | 11/2002 | Kawata |
| 2003/0057625 | A1 | 3/2003 | Kuwata et al. |
| 2004/0113348 | A1 | 6/2004 | Awano |
| 2004/0126163 | A1 | 7/2004 | Asami et al. |
| 2004/0181308 | A1 | 9/2004 | Hayashi et al. |
| 2005/0000336 | A1 | 1/2005 | Hattori et al. |

FOREIGN PATENT DOCUMENTS

| | | | |
|---|---|---|---|
| JP | 04312894 A * | 11/1992 | |
| JP | 2583594 B2 | 11/1996 | |
| JP | 2001-089009 A | 4/2001 | |
| JP | 2003-2511 A | 1/2003 | |
| JP | 2003-081517 A | 3/2003 | |

OTHER PUBLICATIONS

Y. Terao et al., U.S. PTO Office Action, U.S. Appl. No. 11/008,224, filed Nov. 21, 2005, 10 pages.
Y. Terao et al., U.S. PTO Office Action, U.S. Appl. No. 11/008,257, filed Nov. 30, 2005, 9 pages.
Y. Terao et al., U.S. PTO Office Action, U.S. Appl. No. 11/008,271, filed Nov. 30, 2005, 9 pages.
Y. Terao et al., U.S. PTO Office Action, U.S. Appl. No. 11/008,290, filed Nov. 30, 2005, 9 pages.
U.S. Appl. No. 11/008,122, filed Dec. 10, 2004, Sasahara.
U.S. Appl. No. 11/008,124, filed Dec. 10, 2004, Terao et al.
U.S. Appl. No. 11/008,131, filed Dec. 10, 2004, Terao et al.
U.S. Appl. No. 11/008,132, filed Dec. 10, 2004, Terao et al.
U.S. Appl. No. 11/008,142, filed Dec. 10, 2004, Terao et al.
U.S. Appl. No. 11/008,145, filed Dec. 10, 2004, Terao et al.
U.S. Appl. No. 11/008,147, filed Dec. 10, 2004, Terao et al.
U.S. Appl. No. 11/008,148, filed Dec. 10, 2004, Terao et al.
U.S. Appl. No. 11/008,199, filed Dec. 10, 2004, Terao et al.
U.S. Appl. No. 11/008,222, filed Dec. 10, 2004, Terao et al.
U.S. Appl. No. 11/008,224, filed Dec. 10, 2004, Terao et al.
U.S. Appl. No. 11/008,230, filed Dec. 10, 2004, Terao et al.
U.S. Appl. No. 11/008,247, filed Dec. 10, 2004, Terao et al.
U.S. Appl. No. 11/008,248, filed Dec. 10, 2004, Terao et al.
U.S. Appl. No. 11/008,251, filed Dec. 10, 2004, Terao et al.
U.S. Appl. No. 11/008,257, filed Dec. 10, 2004, Terao et al.
U.S. Appl. No. 11/008,271, filed Dec. 10, 2004, Terao et al.
U.S. Appl. No. 11/008,290, filed Dec. 10, 2004, Terao et al.
U.S. Appl. No. 11/008,294, filed Dec. 10, 2004, Terao et al.
U.S. Appl. No. 11/008,295, filed Dec. 10, 2004, Terao et al.
U.S. Appl. No. 11/008,299, filed Dec. 10, 2004, Terao et al.
U.S. Appl. No. 11/008,349, filed Dec. 10, 2004, Terao et al.
U.S. Appl. No. 11/008,381, filed Dec. 10, 2004, Terao et al.
U.S. Appl. No. 11/008,392, filed Dec. 10, 2004, Terao et al.
U.S. Appl. No. 11/008,567, filed Dec. 10, 2004, Terao et al.
Y. Terao, et al., Notice of Allowance and Fee(s) Due, U.S. Appl. No. 11/008,124, filed Sep. 30, 2005, 9 pages.
Y. Terao et al., Notice of Allowance and Fee(s) Due, U.S. Appl. No. 11/008,132, filed Oct. 6, 2005, 9 pages.
Y. Terao et al., U.S. PTO Office Action, U.S. Appl. No. 11/008,392, filed Dec. 14, 2005, 9 pages.
Y. Terao et al., U.S. PTO Office, U.S. Appl. No. 11/008,294, filed Dec. 13, 2005, 9 pages.
Y. Terao et al., U.S. PTO Office, U.S. Appl. No. 11/008,299, filed Dec. 13, 2005, 9 pages.
Y. Terao et al., U.S. PTO Office, U.S. Appl. No. 11/008,349, filed Dec. 13, 2005, 9 pages.
Y. Terao et al., U.S. PTO Office, U.S. Appl. No. 11/008,567, filed Dec. 13, 2005, 9 pages.
Y. Terao et al., U.S. PTO Office Action, U.S. Appl. No. 11/008,148, filed Jan. 11, 2006, 12 pages.
Y. Terao et al., U.S. PTO Office Action, U.S. Appl. No. 11/008,251, filed Jan. 13, 2006, 11 pages.
Y. Terao et al., U.S. PTO Office Action, U.S. Appl. No. 11/008,295, filed Jan. 5, 2006, 11 pages.
U.S. Appl. No. 11/085,226, filed Mar. 22, 2005, Terao et al.
U.S. Appl. No. 11/085,227, filed Mar. 22, 2005, Terao et al.
U.S. Appl. No. 11/085,240, filed Mar. 22, 2005, Terao et al.
U.S. Appl. No. 11/085,241, filed Mar. 22, 2005, Terao et al.
U.S. Appl. No. 11/085,242, filed Mar. 22, 2005, Terao et al.
U.S. Appl. No. 11/085,243, filed Mar. 22, 2005, Terao et al.
U.S. Appl. No. 11/085,244, filed Mar. 22, 2005, Terao et al.
U.S. Appl. No. 11/085,247, filed Mar. 22, 2005, Terao et al.
U.S. Appl. No. 11/085,248, filed Mar. 22, 2005, Terao et al.
U.S. Appl. No. 11/085,250, filed Mar. 22, 2005, Terao et al.
U.S. Appl. No. 11/085,251, filed Mar. 22, 2005, Iizuka et al.
U.S. Appl. No. 11/085,256, filed Mar. 22, 2005, Terao et al.
U.S. Appl. No. 11/085,257, filed Mar. 22, 2005, Terao et al.
U.S. Appl. No. 11/085,264, filed Mar. 22, 2005, Terao et al.
U.S. Appl. No. 11/085,625, filed Mar. 22, 2005, Terao et al.
Y. Terao et al., U.S. PTO Notice of Allowance, U.S. Appl. No. 11/085,243, filed Jan. 5, 2006, with attached Notice of Withdrawal from Issue dated Jan. 10, 2006, 10 pgs.
Y. Terao et al., U.S. PTO Office Action, U.S. Appl. No. 11/008,131, filed Feb. 23, 2006, 9 pgs.
Y. Terao et al., U.S. PTO Office Action, U.S. Appl. No. 11/008,222, filed Feb. 24, 2006, 12 pgs.
Y. Terao et al., U.S. PTO Office Action, U.S. Appl. No. 11/008,230, filed Feb. 24, 2006, 11 pgs.
Y. Terao et al., U.S. PTO Office Action, U.S. Appl. No. 11/085,226, filed Jan. 13, 2006, 9 pgs.
Y. Terao et al., U.S. PTO Office Action, U.S. Appl. No. 11/085,227, filed Feb. 9, 2006, 9 pgs.
Y. Terao et al., U.S. PTO Office Action, U.S. Appl. No. 11/085,240, filed Jan. 26, 2006, 8 pgs.
Y. Terao et al., U.S. PTO Office Action, U.S. Appl. No. 11/085,241, filed Feb. 9, 2006, 9 pgs.
Y. Terao et al., U.S. PTO Office Action, U.S. Appl. No. 11/085,243, filed Jan. 26, 2006, 6 pgs.
Y. Terao et al., U.S. PTO Office Action, U.S. Appl. No. 11/085,244, filed Feb. 9, 2006, 7 pgs.
K. Sasahara et al., U.S. PTO Office Action, U.S. Appl. No. 11/008,122, filed Apr. 19, 2006, 10 pages.

Y. Terao et al., Notice of Allowance and Fee(s) Due, U.S. Appl. No. 11/008,199, filed Apr. 20, 2006, 15 pages.
Y. Terao et al., Notice of Allowance and Fee(s) Due, U.S. Appl. No. 11/008,247, filed May 1, 2006, 16 pages.
Y. Terao et al., Notice of Allowance and Fee(s) Due, U.S. Appl. No. 11/008,349, filed May 2, 2005, 9 pages.
Y. Terao et al., U.S. PTO Office Action, U.S. Appl. No. 11/008,224, filed Apr. 21, 2006, 12 pages.
Y. Terao et al., U.S. PTO Office Action, U.S. Appl. No. 11/008,257, filed Apr. 28, 2006, 13 pages.
Y. Terao et al., U.S. PTO Office Action, U.S. Appl. No. 11/008,271, filed Apr. 25, 2006, 14 pages.
Y. Terao et al., U.S. PTO Office Action, U.S. Appl. No. 11/008,294, filed May 5, 2006, 13 pages.
Y. Terao et al., U.S. PTO Office Action, U.S. Appl. No. 11/008,299, filed May 5, 2006, 12 pages.
Y. Terao et al., U.S. PTO Office Action, U.S. Appl. No. 11/008,392, filed Apr. 26, 2006, 10 pages.
Y. Terao et al., Notice of Allowance and Fee(s) Due, U.S. Appl. No. 11/008,148, filed Jun. 26, 2006, 10 pages.
Y. Terao et al., Notice of Allowance and Fee(s) Due, U.S. Appl. No. 11/008,251, filed Jun. 26, 2006, 10 pages.
Y. Terao et al., Notice of Allowance and Fee(s) Due, U.S. Appl. No. 11/085,241, filed Jun. 26, 2006, 10 pages.
Y. Terao et al., Notice of Allowance and Fee(s) Due, U.S. Appl. No. 11/085,243, filed Jun. 26, 2006, 10 pages.
Y. Terao et al., U.S. PTO Office Action, U.S. Appl. No. 11/008,295, filed Jun. 23, 2006, 14 pgs.
Y. Terao et al., U.S. PTO Office Action, U.S. Appl. No. 11/008,132, filed Jun. 9, 2006, with attached Notice of Withdrawal from Issue dated May 30, 2006, 11 pgs.
Y. Terao et al., Notice of Allowance and Fee(s) Due, U.S. Appl. No. 11/085,244, filed Jul. 13, 2006, 10 pages.
Y. Terao et al., U.S. PTO Office Action, U.S. Appl. No. 11/008,145, filed Jun. 30, 2006, 6 pgs.
Y. Terao et al., U.S. PTO Office Action, U.S. Appl. No. 11/008,147, filed Jul. 7, 2006, 4 pgs.
Y. Terao et al., U.S. PTO Office Action, U.S. Appl. No. 11/008,290, filed Jul. 21, 2006, 15 pgs.
Y. Terao et al., U.S. PTO Office Action, U.S. Appl. No. 11/085,226, filed Jul. 20, 2006, 12 pages.
Y. Terao et al., U.S. PTO Office Action, U.S. Appl. No. 11/085,227, filed Aug. 11, 2006, 15 pages.
Y. Terao et al., U.S. PTO Office Action, U.S. Appl. No. 11/085,240, filed Aug. 2, 2006, 15 pages.
Y. Terao et al., U.S. PTO Office Action, U.S. Appl.No. 11/085,247, filed Jul. 13, 2006, 14 pgs.
Y. Terao et al., U.S. PTO Office Action, U.S. Appl. No. 11/085,248, filed Jul. 5, 2006, 15 pgs.
Y. Terao et al., U.S. PTO Office Action, U.S. Appl. No. 11/085,256, filed Jul. 13, 2006, 13 pgs.
Y. Terao et al., U.S. PTO Office Action, U.S. Appl. No. 11/085,625, filed Jul. 28, 2006, 13 pgs.
Y. Terao, et al., Notice of Allowance and Fee(s) Due, U.S. Appl. No. 11/008,122, filed Jul. 26, 2006, 8 pgs.
Y. Terao et al., Notice of Allowance and Fee(s) Due, U.S. Appl. No. 11/008,295, Sep. 21, 2006, 7 pages.
Y. Terao et al., Notice of Allowance and Fee(s) Due, U.S. Appl. No. 11/008,392, Sep. 15, 2006, 10 pages.
Y. Terao et al., U.S. PTO Office Action, U.S. Appl. No. 11/008,381, Aug. 23, 2006, 17 pages.
Y. Terao et al., U.S. PTO Office Action, U.S. Appl. No. 11/008,567, Aug. 21, 2006, 14 pages.
Y. Terao, et al., Notice of Allowance and Fee(s) Due, U.S. Appl. No. 11/008,222, Aug. 31, 2006, 12 pgs.
Y. Terao, et al., Notice of Allowance and Fee(s) Due, U.S. Appl. No. 11/008,299, Sep. 6, 2006, 9 pgs.
Y. Terao et al., U.S. PTO Office Action, U.S. Appl. No. 11/008,131, Oct. 17, 2006, 15 pages.
Y. Terao et al., U.S. PTO Office Action, U.S. Appl. No. 11/008,132, Nov. 24, 2006, 16 pages.
Y. Terao et al., U.S. PTO Office Action, U.S. Appl. No. 11/008,224, Nov. 17, 2006, 13 pages.
Y. Terao et al., U.S. PTO Office Action, U.S. Appl. No. 11/008,230, Nov. 13, 2006, 17 pages.
Y. Terao et al., U.S. PTO Office Action, U.S. Appl. No. 11/008,294, Oct. 24, 2006, 11 pages.
Y. Terao et al., U.S. PTO Office Action, U.S. Appl. No. 11/085,625, Nov. 21, 2006, 13 pages.
Y. Terao, et al., Notice of Allowance and Fee(s) Due, U.S. Appl. No. 11/008,257, Oct. 24, 2006, 11 pgs.

* cited by examiner

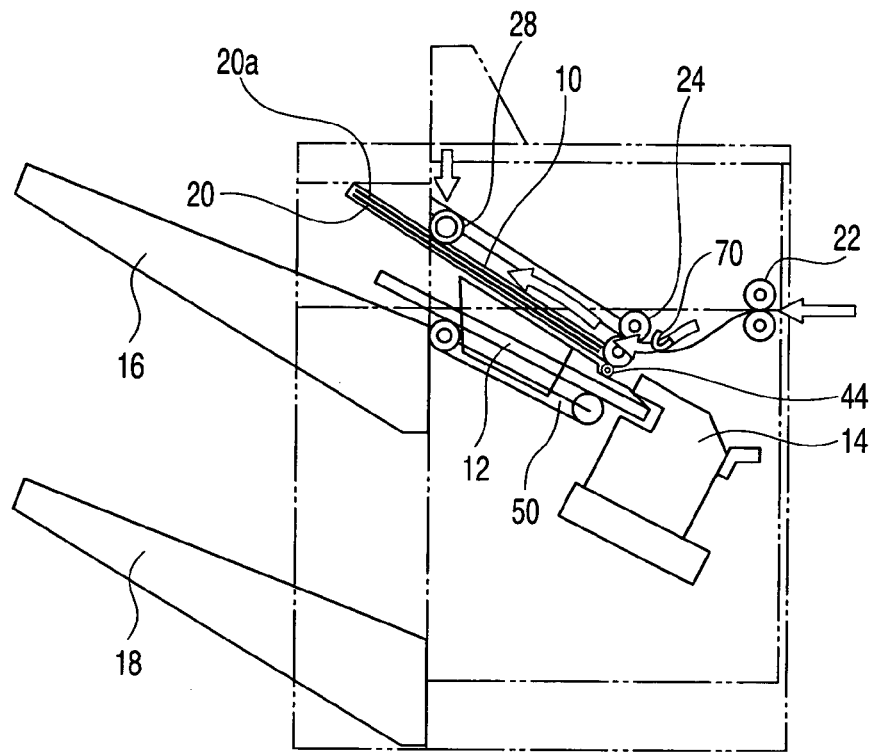
F I G. 10
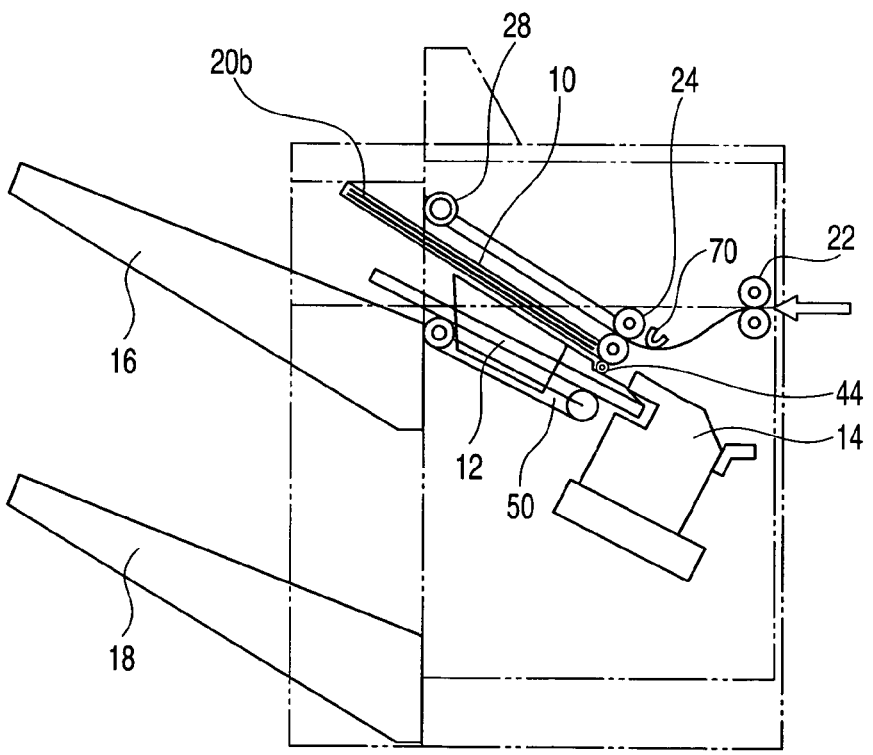
F I G. 11

PUSH FEED ARM FOR POST PROCESSING DEVICE

CROSS-REFERENCE TO RELATED APPLICATIONS

This application is based upon and claims the benefit of priority from prior Japanese Patent Application No. 2004-281780, filed Sep. 28, 2004, the entire contents of which are incorporated herein by reference.

BACKGROUND OF THE INVENTION

1. Field of the Invention

The present invention relates to an apparatus (finisher) for bundling sheets sent from an image forming apparatus and carrying out, for example, staple processing, and a processing tray for use in the post-process apparatus.

2. Description of the Related Art

A post-process apparatus comprises: a processing tray for bundling sheets sent from an image forming apparatus, thereby carrying out, for example, staple processing, and ejecting the processed bundles of sheets; and a storage tray for holding the ejected bundles of sheets. A staple processing speed of the post-process apparatus is slow as compared with an image processing speed of the image forming apparatus. Thus, if a sheet is directly sent to the processing tray, a sheet to be staple processed next is transported while a preceding sheet is staple processed. In order to prevent this problem, conventionally, a buffer mechanism for adjusting a carrying-in timing of a sheet at a front stage of the processing tray is proposed.

Japanese Patent Document 1: Japanese Patent No. 2583594 discloses a mechanism for retaining sheets is provided at a transport passage for sending sheets sent from an image forming apparatus to a processing tray. However, in this case, there is a need for increasing the transport passage in length, and, as a result, the post-process apparatus is likely to be large in size. Japanese patent document 2: Jpn. Pat. Appln. KOKAI Publication No. 2003-2511 discloses a specific belt for integrally forming a belt and a push feed face so as not to form a gap between the belt and an arm. If such a specific belt is used, high cost may result. In the present invention, a member other than such a specific belt is used to prevent cut-in. The invention disclosed in the above patent document is technically different from the present invention. Therefore, advantageous effect of the present invention cannot be attained.

BRIEF SUMMARY OF THE INVENTION

The Inventors proposes here that a waiting tray is newly allocated as a buffer mechanism at an upper stage of a processing tray. The waiting tray according to this proposal is allocated to be proximal to the upper stage of the processing tray, and a sheet transported from an image forming apparatus to the processing tray is temporarily retained here in a waiting mode. At a time point when retention in a waiting mode is released, that is, at a time point when staple processing of a bundle of sheets at the processing tray terminates, and then, the bundle of sheets is transported from the processing tray to a storage tray, the sheet is supported on a bottom face of the waiting tray. By opening this tray, the sheet is then dropped at the distal end side (upstream side when the sheet is transported to the waiting tray) to the processing tray. By using this waiting tray, equipment can be allocated with a simple mechanism without a need to increase a transport passage in length and providing a space. As a result, a post-process apparatus can be made compact. Moreover, it is possible to sent the sheets to the processing tray without any malfunction.

However, in this case, there is a danger that, when a sheet dropped from the standby try is transported from the processing tray to the storage tray, the sheet distal end cuts into the sheet press feed face of a push feed arm for the sheet.

The present invention provides a post-process apparatus and a processing tray, the post-process apparatus capable of transporting a sheet from the processing tray to a storage tray without being cut into a push feed arm of a transport belt with a simple, inexpensive mechanism.

In order to solve the above described problem, the present invention comprises the following features.

1. A sheet post-process apparatus, the apparatus comprising:

a waiting tray which temporarily retains a transported sheet and releases the support to the sheet;

a processing tray which bundles the sheets dropped from the waiting tray to carry out predetermined processing and ejects the bundled sheets; and a storage tray which holds the bundle of sheets processed and ejected on the processing tray, wherein the processing tray comprises:

a transport belt which transports a sheet; and a push feed arm mounted to be projected onto a surface on a sheet transport side of the belt, the arm retaining a sheet distal end so that the sheet distal end can be pushed and fed;

wherein the transport belt forms a through hole through which the push feed arm penetrates, and the push feed arm comprises: a push feed face which pushes and feeds the sheet distal end; a penetrating projection portion which reaches a transport belt lower face from the push feed face through the through hole; and a hook shaped engagingly lock portion engagingly locked on the belt lower face after being bent from the penetrating projection portion to the transport belt traveling direction.

2. A sheet post-process apparatus, the apparatus comprises:

a waiting tray which temporarily retains a transported sheet and releases the support to the sheet;

a processing tray which bundles the sheets dropped from the waiting tray to carry out predetermined processing and ejects the bundled sheets; and a storage tray which holds the bundle of sheets processed and ejected on the processing tray, wherein the processing tray comprises:

a transport belt which transports a sheet;

a push feed arm mounted to be projected onto a surface on a sheet transport side of the belt, the arm retaining a sheet distal end so that the sheet distal end can be pushed and fed; and a lock which locks the push feed arm to the belt, the transport belt has first to third through holes, the push feed arm comprises: a push feed face which pushes and feeds the sheet distal end; a first penetrating projection portion which reaches the lower face of the transport belt from the push feed face through the first through hole; a hook shaped engagingly lock portion engagingly locked on the belt lower face after being bent from the first penetrating projection portion in the transport belt traveling direction; a mount face coming into contact with the arm on a back side of the push feed face, the mount face having formed therein a through hole which communicates with the second through hole of the belt; and a second penetrating projection portion which reaches the lower face of the transport belt through the third through hole of the belt, and the lock locks the arm mount face to the belt through the through hole of the arm and the second through hole of the belt.

3. A sheet post-process apparatus according to 1, wherein a face of the hook shaped engagingly lock portion on a side which comes into contact with the belt lower face is inclined in a downward direction at an angle of 10 degrees to 30 degrees while a longitudinal direction of the belt is defined as a reference.

4. A processing tray of a post-process apparatus, comprising:

a transport belt which transports a sheet; and a push feed arm mounted to be projected onto a surface on a sheet transport side of the belt, the arm retaining a sheet distal end so that the sheet distal end can be pushed and fed, the transport belt forms a through hole through the push feed arm penetrates, and the push feed arm comprises: a push feed face which pushes and feeds the sheet distal end; a penetrating projection portion which reaches a transport belt lower face from the push feed face through the through hole; and a hook shaped engagingly lock portion engagingly locked on the belt lower face after being bent from the penetrating projection portion to the transport belt traveling direction.

5. A processing tray of a post-process apparatus, comprising:

a transport belt which transports a sheet;

a push feed arm mounted to be projected onto a surface on a sheet transport side of the belt, the arm retaining a sheet distal end so that the sheet distal end can be pushed and fed; and a lock which locks the push feed arm to the belt, wherein the transport belt has first to third through holes, the push feed arm comprises: a push feed face which pushes and feeds the sheet distal end; a first penetrating projection portion which reaches the lower face of the transport belt from the push feed face through the first through hole; a hook shaped engagingly lock portion engagingly locked on the belt lower face after being bent from the first penetrating projection portion in the transport belt traveling direction; a mount face coming into contact with the arm on a back side of the push feed face, the mount face having formed therein a through hole which communicates with the second through hole of the belt; and a second penetrating projection portion which reaches the lower face of the transport belt through the third through hole of the belt, and the lock locks the arm mount face to the belt through the through hole of the arm and the second through hole of the belt.

6. A processing tray of a post-process apparatus, according to 4, wherein a face of the hook shaped engagingly lock portion on a side which comes into contact with the belt lower face is inclined in a downward direction at an angle of 10 degrees to 30 degrees while a longitudinal direction of the belt is defined as a reference.

In the present specification and claims, a proximal end side, a distal end side, and a sheet width are defined as follows. That is, when a transport direction of a sheet to be transported to a waiting tray is defined as a reference, a downstream side in the transport direction is defined as a proximal end side; an upstream side in the transport direction is defined as a distal end side; and a length in a transverse direction when the sheet transport direction is defined as a longitudinal direction is defined as a sheet width. In addition, a sheet denotes a copy sheet on which a toner image (developed image) is copied and which is sent from the image forming apparatus.

According to the present invention, inexpensive parts are mounted without using a specific transport belt, whereby a sheet can be reliably transported without being cut into a push feed arm of a transport belt. That is, a penetrating projection is allocated on a distal end push feed face of the arm by penetrating the belt, so that the sheet is not cut into a depth of the distal end push feed face by this penetrating projection. In addition, a proximal end of the penetrating is formed in a hook shape (hook shaped engagingly lock portion). Thus, the distal end push feed face is not floated from the belt, and the penetrating projection does not slip off from the belt. Moreover, this hook shaped engagingly lock portion is provided to be inclined in a downward direction while a belt traveling direction is defined as a reference. For example, this engagingly lock portion is inclined downwardly from an angle of 10 degrees to an angle of 30 degrees. Thus, even if the arm is placed at a portion along a radius of a pulley, a load does not increase, enabling natural rotation. Therefore, there is no danger that the arm slips off from the belt.

BRIEF DESCRIPTION OF THE SEVERAL VIEWS OF THE DRAWING

FIG. 10 is a view illustrating an operation of a waiting tray roller in the post-process apparatus showing one embodiment of the invention;

FIG. 11 is a view illustrating an operation of the waiting tray roller in the post-process apparatus showing one embodiment of the invention;

DETAILED DESCRIPTION OF THE INVENTION

Now, one embodiment of the present invention will be described here.

(General Description of Image Forming Apparatus)

Figure 18:
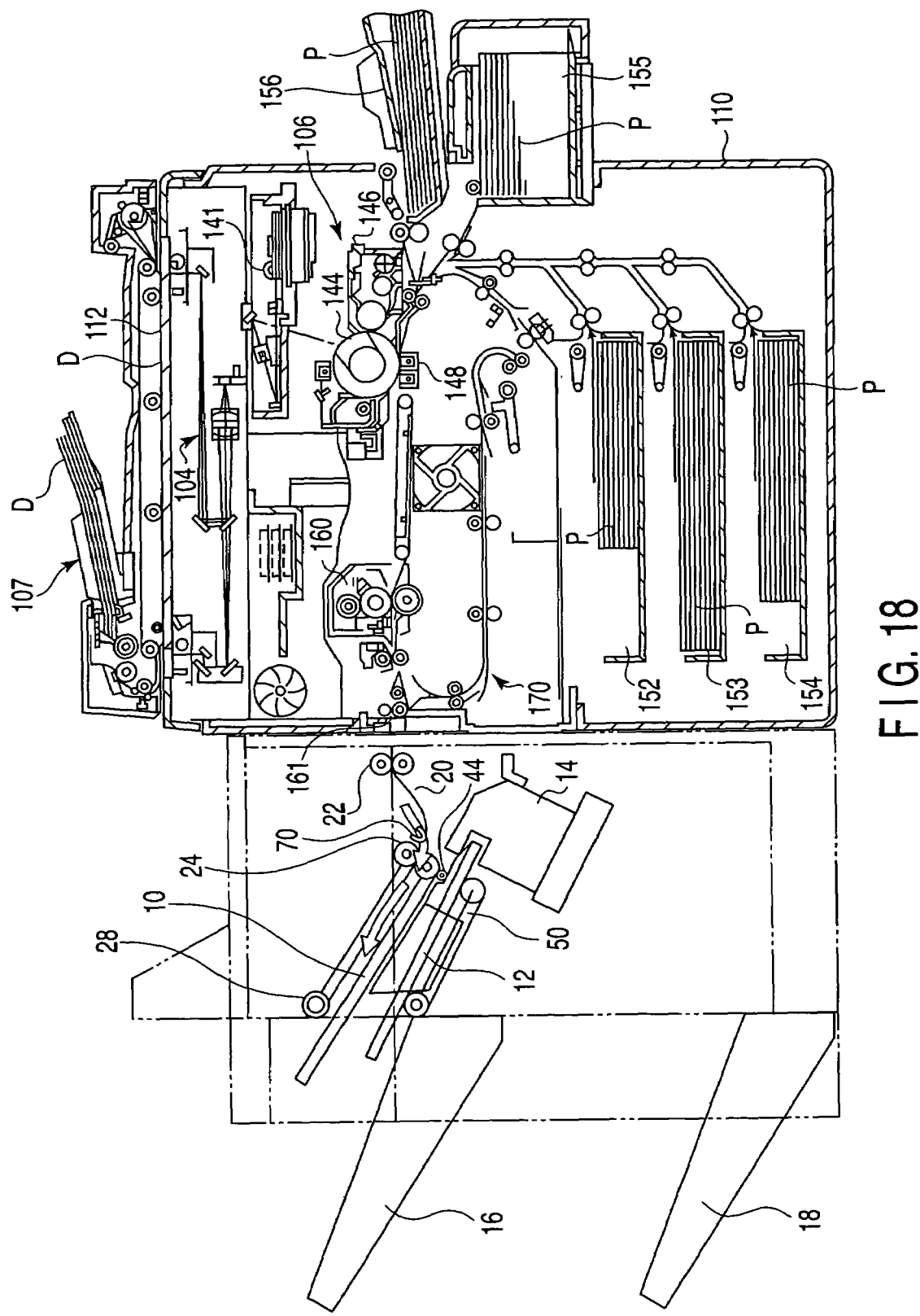
FIG. 18 is a view showing a combination of the post-process apparatus and the image forming apparatus according to the present invention.
Figure 19:
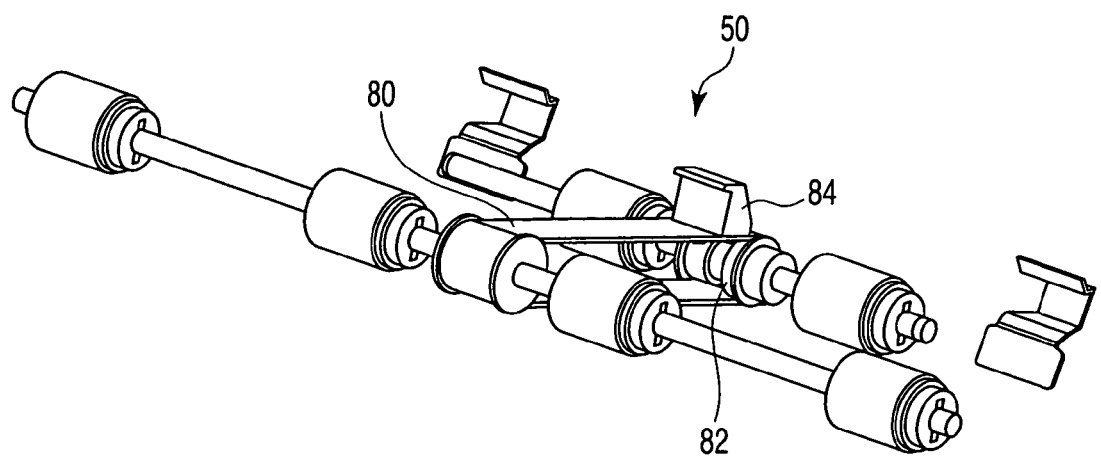
FIG. 19 is a perspective view of a transport belt of the processing tray showing one embodiment of the present invention.
Figure 20:
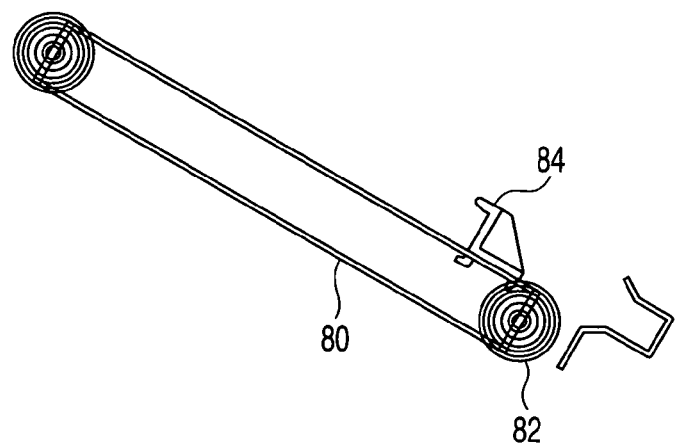
FIG. 20 is a side view of the transport belt of the processing tray showing one embodiment of the present invention.

A general description of an image forming apparatus (digital copying machine) allocated at a front stage of a post-process apparatus according to the present invention will be given with reference to FIG. 18. A manuscript placement base 112 is provided at an upper face of this apparatus. An auto document feeder 117 (hereinafter, referred to as an ADF) for automatically feeding a document D onto the manuscript placement base 112 is allocated on the manuscript placement base. The manuscript D is placed on the ADF, predetermined settings (such as the presence of absence of staple processing, how to carry out staple processing, the number of copies, or size of sheet to be copied, for example), and then, a copy start button is pressed. The manuscript D on the ADF is transported to a predetermined location of the manuscript placement base 112.

A scanner unit 4, a printer unit 6, and a copy sheet cassette and feeder are arranged at the inside of the image forming apparatus. At the scanner unit 4, the manuscript D on the manuscript placement base 112 is scanned, and reflection light thereof is incident. The incident reflection light is converted in a photoelectric manner, image information on the manuscript D is read, and a photoelectric signal corresponding to the read image information is output. At the printer unit 6, according to the image information or the like on the manuscript D read by the scanner unit 4, an electrostatic latent image is formed on a peripheral face of a photosensitive drum 144 by a semiconductor laser 141. Then, a toner is supplied from a developing device 146 to the photosensitive drum 144; the electrostatic latent image formed on the photosensitive drum 144 is substantially produced, and a tone image is formed.

To this photosensitive drum 144, a copy sheet P is sent from cassettes 52, 53, 54, and 56 or a feeder 55 of the copy sheet P, and the toner image on the photosensitive drum 144 is copied onto the copy sheet by a transfer charger 148. Then, the toner image of the copy sheet is fixed by a fixing device 160, and the fixed toner image is ejected from an ejection port 161. This sheet comes under the sheet of the present specification and claims.

In a control circuit of the image forming apparatus side, information concerning a sheet such as sheet size, the presence or absence of sort, or the presence or absence of staple processing is entered by operator's data input and/or an input signal from sensor means provided in the image forming apparatus. The control circuit at the image forming apparatus side sends information concerning a sheet transported to the control circuit of the post-process apparatus side based on these items of information. The information includes the following. For example, the sheet is provided as a sheet retained in the waiting tray in a waiting mode, the sheet being a sheet other than a last sheet to be held. The sheet is provided as a sheet retained in the standby sheet in a waiting mode, the sheet being a last sheet to be held. The sheet is provided as a sheet retained in the waiting tray in a waiting mode (a sheet being directly dropped on the processing sheet). The sheet is provided as a sheet being directly ejected to the storage tray without being dropped on the waiting tray. Information concerning dimensions of a sheet to be transported to the post-process apparatus (such as A3 or A4 size, for example) or sheet length (such as ordinary paper or a variety of cardboards, for example) is also sent from a control circuit at the image forming apparatus side to a control circuit at the post-process apparatus side.

Information concerning a length of a sheet which is larger than that of a set sheet is sensed by a sensor provided in the post-process apparatus. The sensed information is sent from this sensor to the control circuit at the post-process apparatus side.

(General Description of Post-Process Apparatus)

A general description of the post-process apparatus will be given with reference to FIG. 18. The post-process apparatus is provided as an apparatus for bundling sheets 20 transported from an image forming apparatus, thereby carrying out staple processing or the like. This post-process apparatus is allocated in contact with the ejection port 161 of the image forming apparatus. That is, a sheet transport inlet is provided in association with the ejection port 161 of the image forming apparatus, and an inlet roller 22 is allocated in this sheet transport inlet. The inlet roller 22 introduces the sheets 20 into a paper pass ceiling 36 for forming a transport passage in the post-process apparatus (refer to FIG. 1). This paper pass ceiling 36 guides a sheet to a waiting tray 10 and a processing tray 12. Two storage trays 16 and 18 are allocated at the downstream side of the processing tray 12 (at the downstream side of the waiting tray 10).

The waiting tray 10 is allocated to be proximal to the upper stage of the processing tray 12 while the waiting tray is inclined so as to be upward at the proximal end side of the sheet to be transported and so as to be downward at the distal end side. A paper feed roller 24 is provided at the distal end side of this waiting tray 10 (at the upstream side of the sheet to be transported), and a waiting tray roller 28 is provided at the proximal end side of the tray (at the downstream side of the sheet to be transported). A sheet sensor 70 is provided at the transport inlet of the paper feed roller 24. This sensor senses a proximal end and a distal end of the sheet to be transported.

The processing tray 12 is allocated at the lower stage of the processing tray 12 while the processing tray is inclined so as to be upward at the proximal end side of the sheet (at the downward side of the sheet to be transported to the storage tray) and so as to be downward at the distal end side (upstream side of the sheet to be transported to the ejected paper storage tray). A stapler 14 is provided at the distal end side of the processing tray 12. A transport mechanism 50 is provided on the processing tray 12 so as to transport a bundle of staple processed sheets or the like to the storage tray 16 or 18.

Here, in the post-process apparatus according to the present invention, the waiting tray 10 and the processing try 12 both are small in size, as compared with the size of sheet to be transported in order to make equipment compact. Since the waiting tray 12 is small in size than a sheet to be held thereon, when a sheet is dropped from the waiting tray 10 to the processing tray 12, that sheet is held across the processing tray 12 and the storage tray 16 (or 18) (refer to FIGS. 10 to 13).

A control circuit of the post-process apparatus controls the waiting tray 10 to make a proper operation based on information concerning a sheet obtained from the control circuit at the image forming apparatus side and information available from the sheet sensor 70.

For example, when a sheet transported to the waiting tray is provided as a sheet which should be retained on the waiting tray in a waiting mode, the sheet being a sheet other than a last sheet to be held, this sheet is kept to be held in a proper location of the waiting tray.

When the above sheet is provided as a sheet to be retained on the standby sheet in a waiting mode, the sheet being a last sheet to be held, that sheet is aligned in a proper location, and is dropped on the processing tray together with the sheet which has been held in advance on the waiting tray.

When the sheet is provided as a sheet which is not required to be retained on the waiting tray in a waiting mode, that sheet is directly dropped on the processing tray.

When the sheet is provided as a sheet to be directly ejected on the storage tray without being dropped on the processing tray, that sheet is directly transported from the waiting tray to the storage tray without intervening the processing tray.

When the sheet is provided as a sheet which is larger than a set sheet (for example, a sheet of A3 in size), the waiting tray is increased in length by expanding it.

<Waiting Tray>

Figure 1:
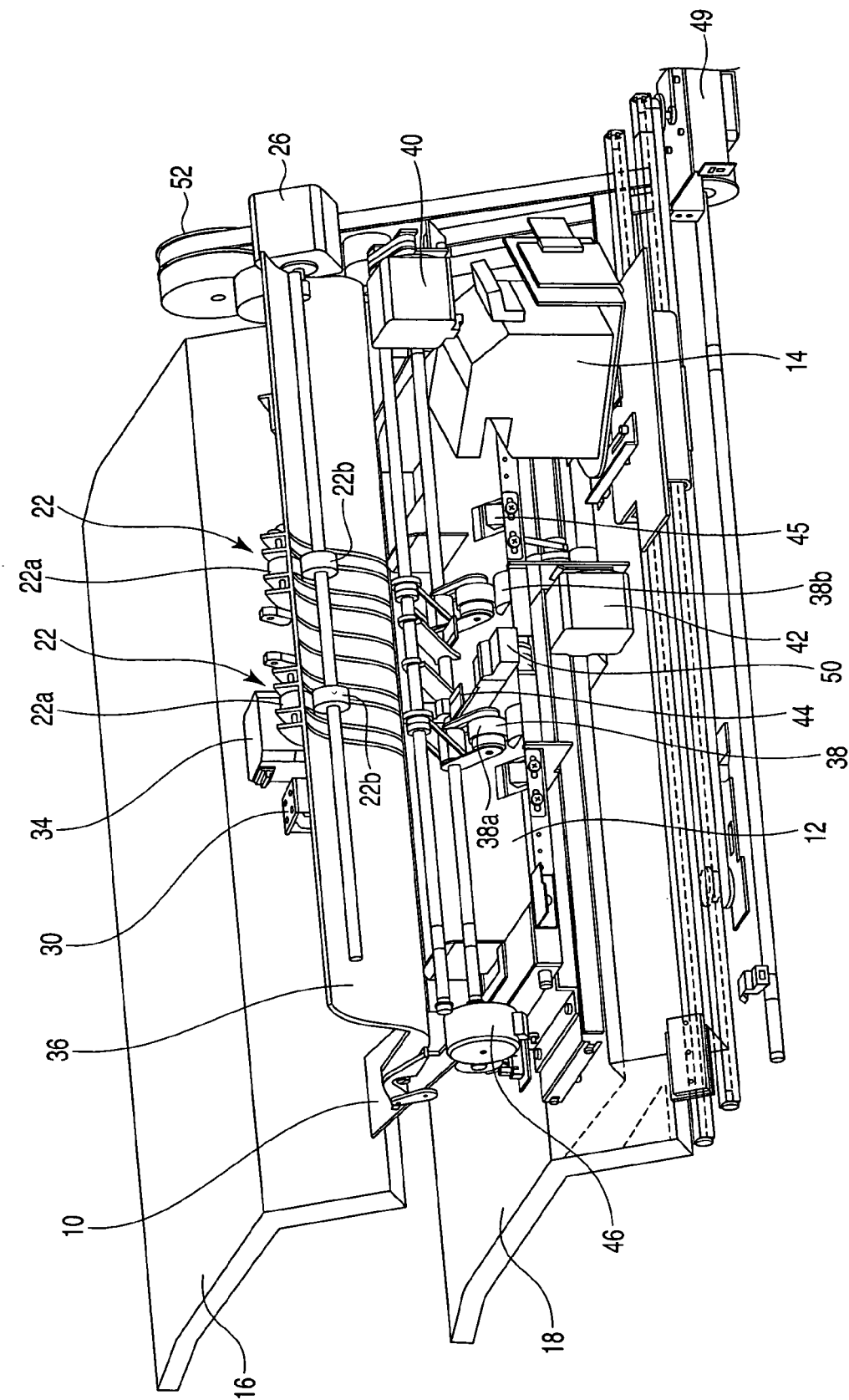
FIG. 1 is a perspective view of a post-process apparatus showing one embodiment of the present invention.
Figure 2:
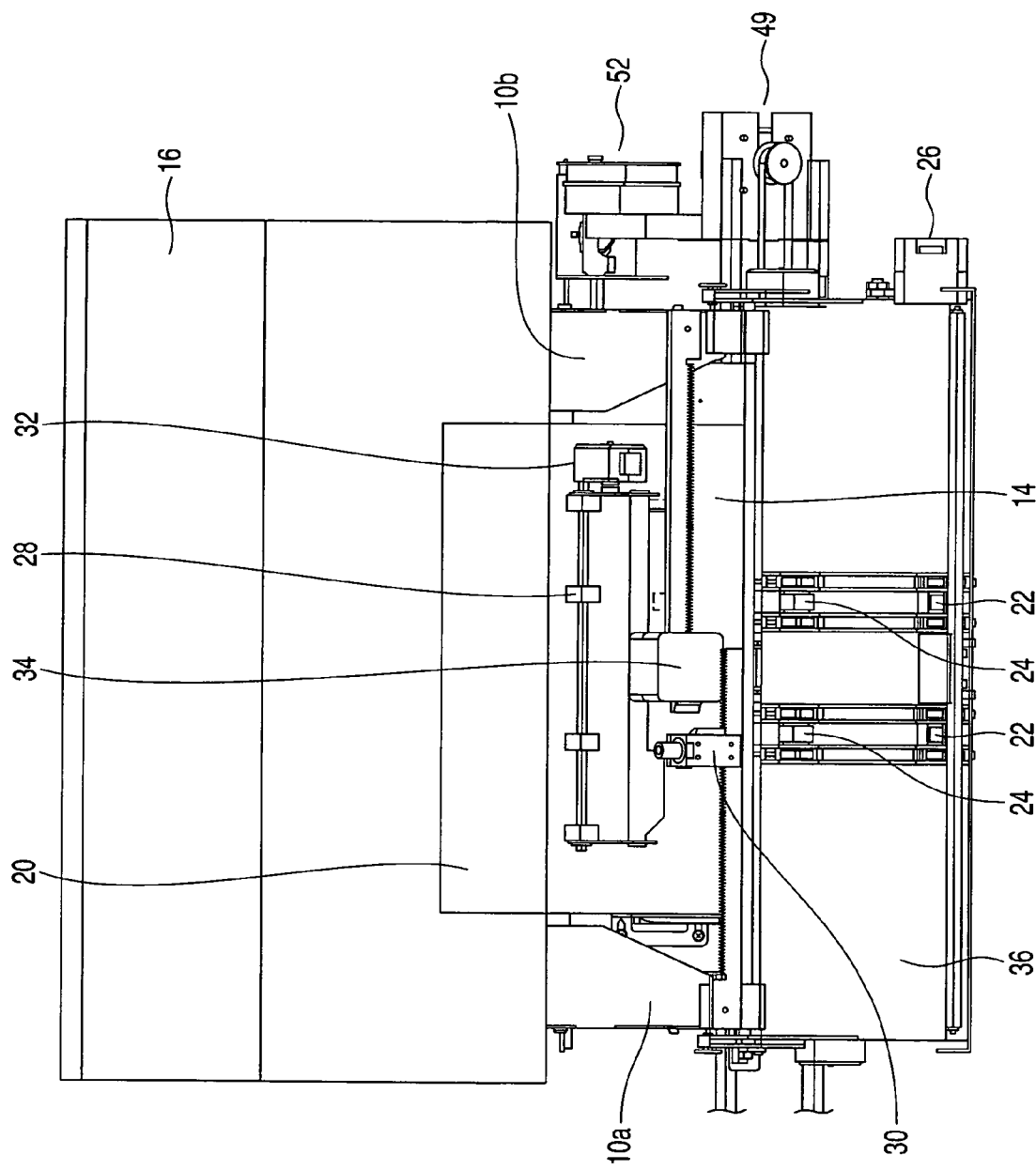
FIG. 2 is a top view of the post-process apparatus showing one embodiment of the invention.
Figure 3:
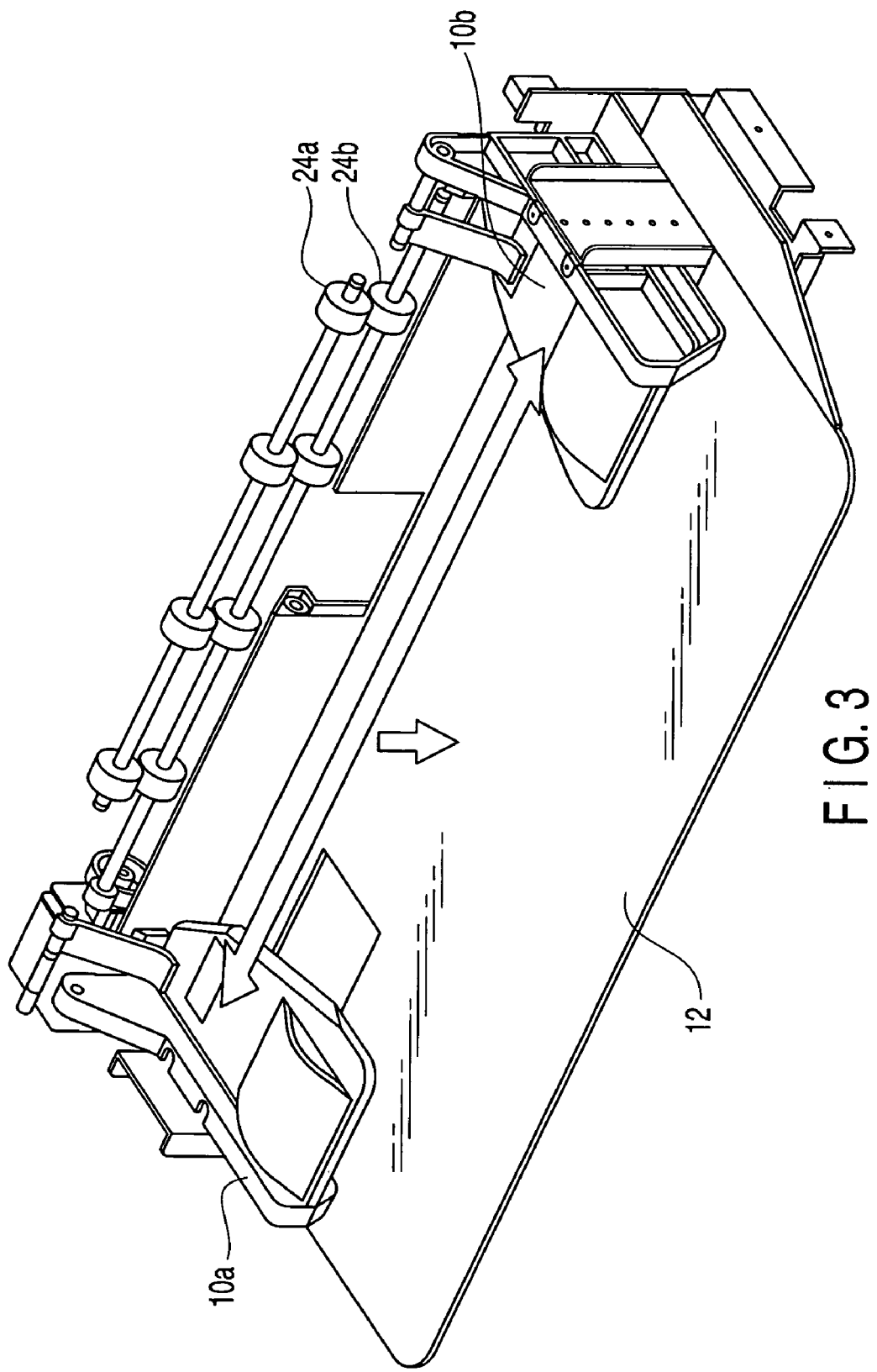
FIG. 3 is a view illustrating an operation of a waiting tray showing one embodiment of the invention.

The waiting tray will be described with reference to FIGS. 1, 2 and 3. As has been already described, when a preceding sheet is processed on the processing tray, a next sheet cannot be transported on the processing tray. The waiting tray is intended for make the next sheet standby in this state. The inlet roller 22 includes an upper inlet roller 22a and a lower inlet roller 22b. These rollers are driven by an inlet roller motor 26. The paper feed roller 24 includes an upper paper feed roller 24a and a lower paper feed roller 24b. These rollers are driven by a paper feed roller motor. The waiting tray roller 28 can be operated to be vertically elevated. This operation is controlled by a waiting tray roller drive source 30. The waiting tray roller 28 enables normal and invert rotation. This normal and invert rotation is carried out by a waiting tray roller motor 32.

On the waiting tray 10, left and right lower face support members 10a and 10b for supporting both sides of the lower face of a sheet carried into the waiting tray are provided in the left and right widthwise direction. A space between the left and right lower face support members is open. Therefore, a center section of the sheet lower face is not supported. The upper faces of these left and right lower face support members 10a and 10b each are formed in a flat shape, and a curved face which is upwardly curved is formed at its top end side. Instead of this curved face or together with the curved face, a roller which is rotatable in an arbitrary direction may be engaged. The left and right lower face support members 10a and 10b are formed to be wide in width at a proximal end side thereof and to be narrow in width at a distal end side thereof. As a result, the width of the opening portion formed between the lower face support members is wide at the proximal end side and narrow at the distal end side. The width used here denotes a transverse direction in the case where the sheet transport direction is defined as a longitudinal direction. The left and right lower face support members 10a and 10b are set in location in which a sheet side face can be supported fully on the left and right lower face support members at a first position. At a second position, these support members are set in location in which they are opened to an extent such that the proximal end side of the sheet is supported by the left and right lower face support members while the distal end side of the sheet is not supported by the left and right lower face support members. In addition, at a third position, the above support members are set in a location in which the support of the sheet is fully released. The left and right lower face support members 10a and 10b are driven by a waiting tray motor 34. By this waiting tray motor 34, the left and right lower face support members are moved to be slid to adjust the opening width of the opening portion. Then, the left and right lower face support members 10a and 10b are moved to any one of the first to third positions.

The waiting tray roller 28 returns the sheet transported to the waiting tray to the distal end side, and aligns the sheet distal end by abutting the sheet distal end against a distal end 60 of the waiting tray. In this case, although the sheets are located upwardly when they are transported to the waiting tray, the roller is lowered in the case where the sheet distal end is aligned. Then, the sheets are rotated while the sheets are compressed, and the sheets are pushed back. In addition, also in the case where the sheets are transported from the waiting tray directly to the storage tray, the waiting roller is lowered and is rotated while the sheets are compressed, and the sheets are ejected. In this case, the rotation direction of the waiting tray roller 28 becomes inverted from that in the case where the sheets are abutted against the distal end side.

On the waiting tray 10, there is provided the sheet sensor 70 (refer to FIG. 18 or the like) for sensing a sheet to be proximal to the paper feed roller 24, i.e., at a side (upstream side) at which a sheet is carried in the waiting tray. This sheet sensor 70 senses the start of transport (sheet proximal end) by the paper feed roller 24 and the end of transport (sheet distal end) by the paper feed roller 24. This sense signal is fed to control means of the post-process apparatus.

The control means of the post-process apparatus having received information from the control means of the image processing apparatus (for example, the presence or absence of staple processing, how to carry out staple processing, the number of copies, and signal of size of sheet to be copied) senses whether the sheet to be transported to the waiting tray is provided as a sheet which should be retained on the waiting tray in a waiting mode or is provided as a sheet which is not required to be retained in a waiting mode. For example, the control means senses that the first and second sheets are provided as sheets to be retained on the waiting tray in a waiting mode and the third or subsequent sheets are provided as sheets which are not required to be retained in a waiting mode, based on information indicating how to carry out staple processing. Alternatively, the control means senses that retention in a waiting mode on the waiting tray is not required from the information indicating that no staple processing is carried out. Further, the control means having received a signal from the sheet sensor 70 senses a state in which the sheet is carried into the waiting tray 10. Then, the control means of the post-process apparatus instructs the drive motor of the lower face support members 10a and 10b to output a control signal of a release timing or a release quantity (release width) of the left and right lower face support members 10a and 10b. Then, a sheet is properly dropped onto the processing tray 12 with a proper timing.

On the other hand, in the case where the sheet transported to the waiting tray is a sheet which is not required to be retained in a waiting mode, when a sheet distal end reaches the waiting tray, the left and right lower face support members 10a and 10b are released immediately without the sheet being retained in a waiting mode. As a result, the sheet is dropped from its distal end side to the processing tray while the sheet is supported at its proximal end side.

<Processing Tray>

The processing tray carries out longitudinal or transverse alignment with respect to bundles of sheets dropped from the waiting tray, and carries out predetermined processing (for example, staple processing). This processing tray is allocated in an inclined shape in which is high at the proximal end side and which is low at the distal end side.

Figure 4:
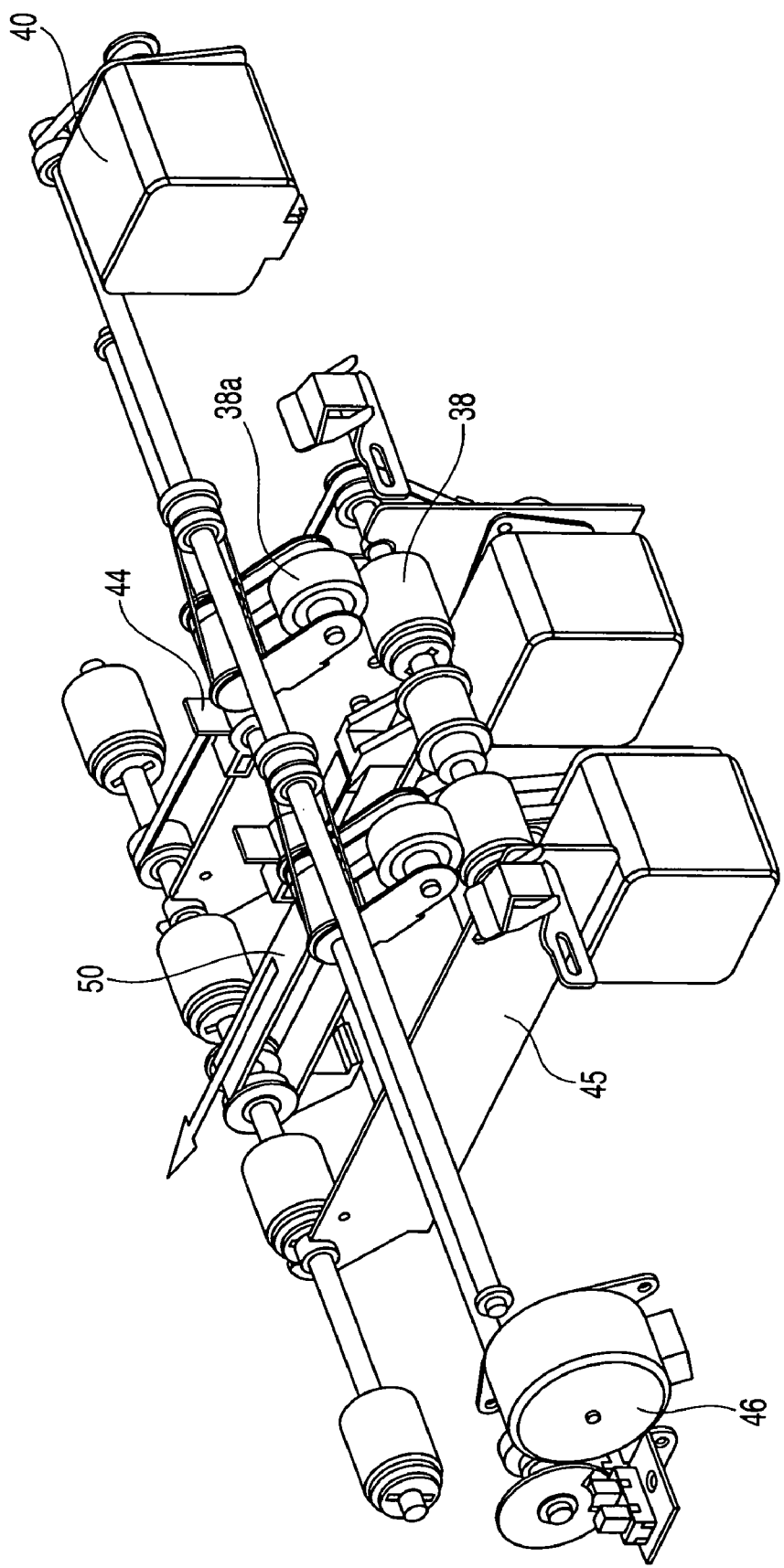
FIG. 4 is a view illustrating a longitudinal alignment and sheet bundle transport mechanism of the post-process apparatus showing one embodiment of the invention.

As shown in FIG. 4, longitudinal alignment is carried out by a longitudinal alignment roller 38. A longitudinal alignment upper roller 38a is driven by a longitudinal alignment upper roller motor 40. A longitudinal alignment lower roller 38b is driven by a longitudinal alignment lower roller motor 42. Sheets are aligned while a stopper 45 is defined as a reference. In addition, in order to assist this alignment, a paddle 44 is provided. This paddle 44 is driven by a paddle motor 46.

Figure 5:
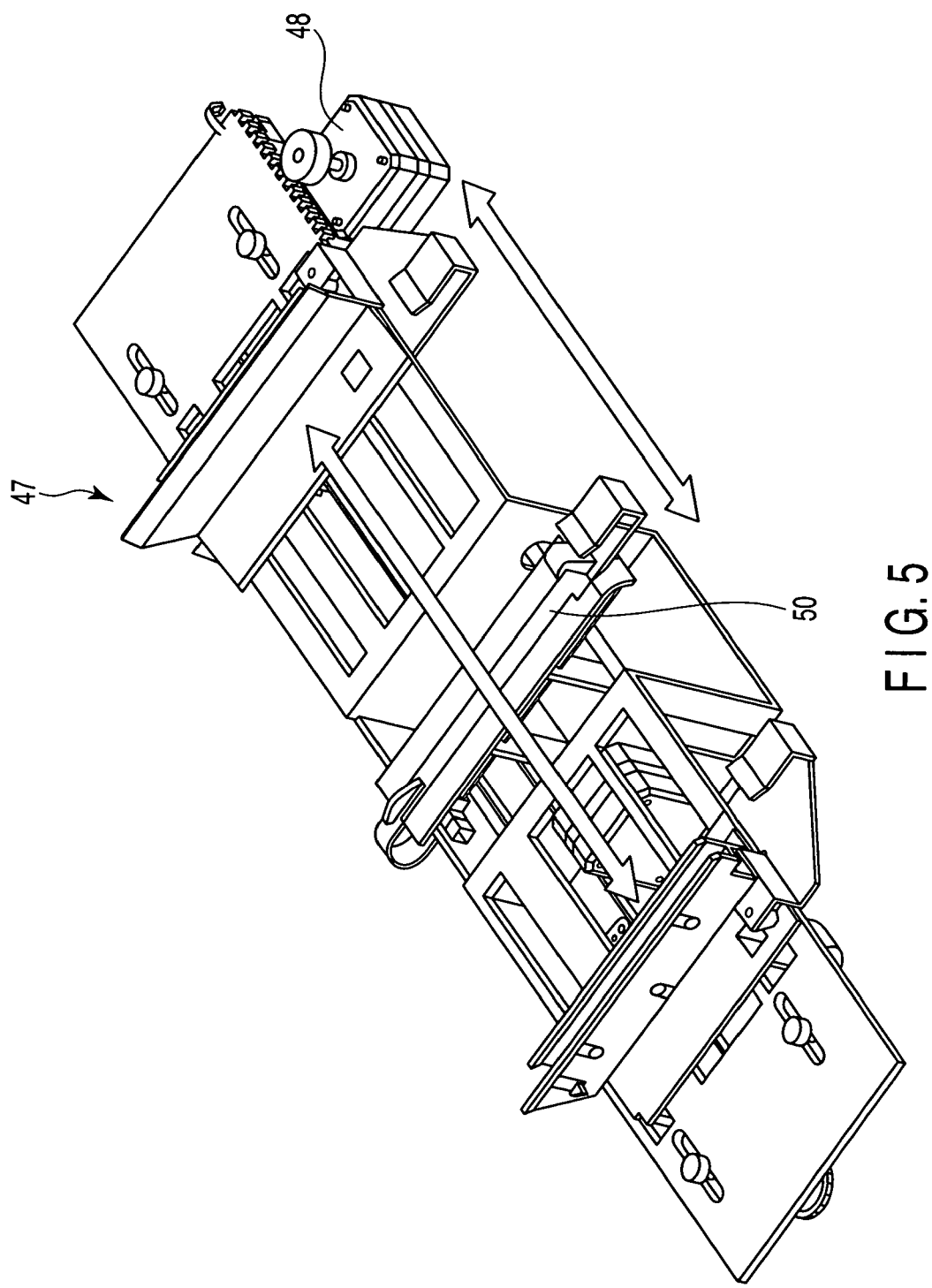
FIG. 5 is a view illustrating a transverse alignment mechanism of the post-process apparatus showing one embodiment of the invention.

As shown in FIG. 5, transverse alignment is executed by a transverse alignment mechanism 47 and a transverse alignment motor 48.

When a predetermined number of sheets are aligned and held on the processing tray 12, staple processing is carried out by the stapler 14.

Figure 6:
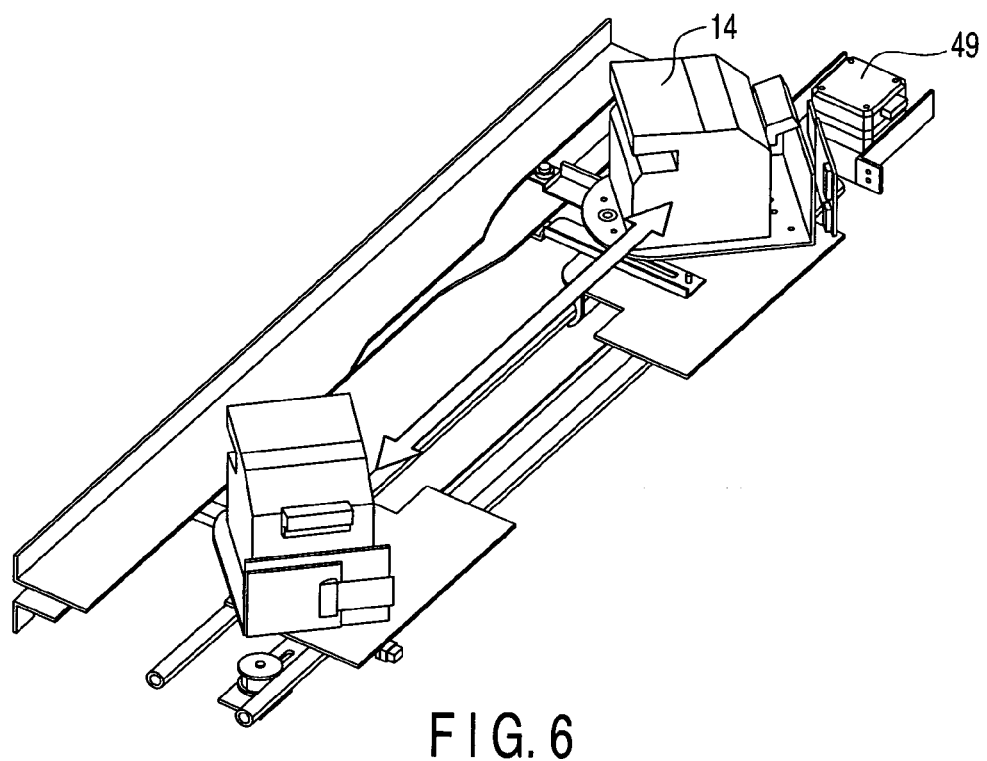
FIG. 6 is a view illustrating an operation of a stapler of the post-process apparatus showing one embodiment of the invention.
Figure 7:
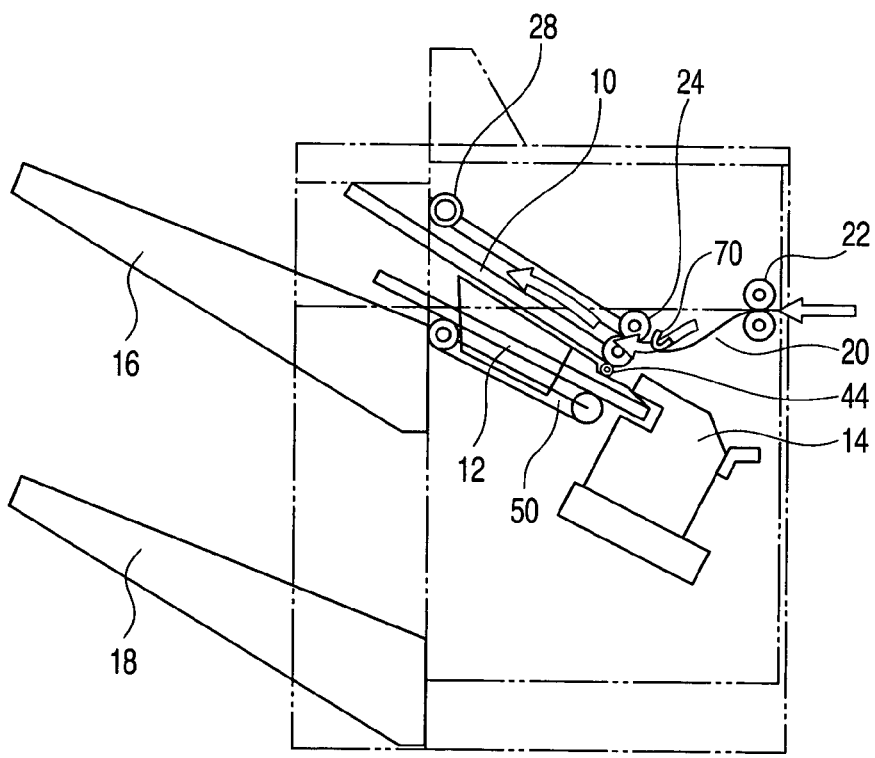
FIG. 7 is a view illustrating a flow of a first sheet of sheets between an inlet roller and a paper feed roller in the post-process apparatus showing one embodiment of the invention.
Figure 8:
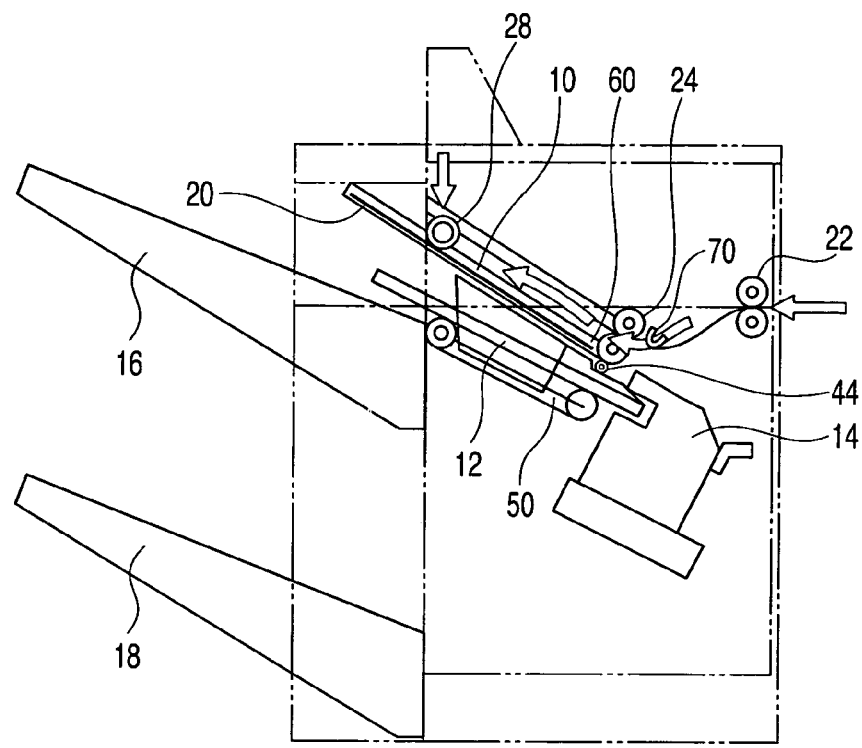
FIG. 8 is a view illustrating a flow of a first sheet of sheets between the paper feed roller and a standby roller in the post-process apparatus showing one embodiment of the invention.
Figure 9:
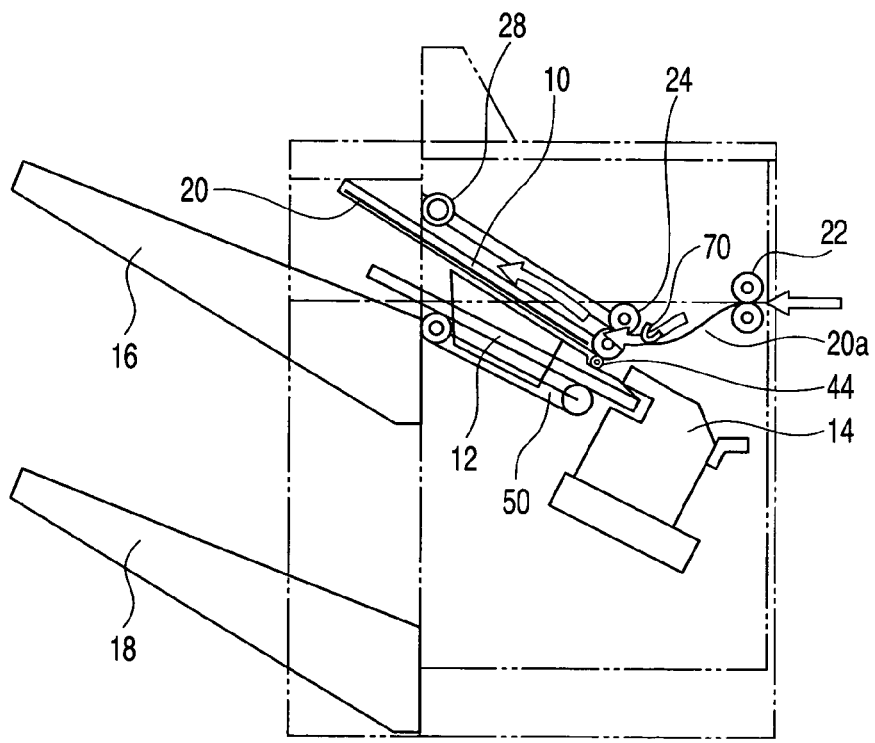
FIG. 9 is a view illustrating a flow of a second sheet of sheets between the paper feed roller and the standby roller in the post-process apparatus showing one embodiment of the invention.
Figure 12:
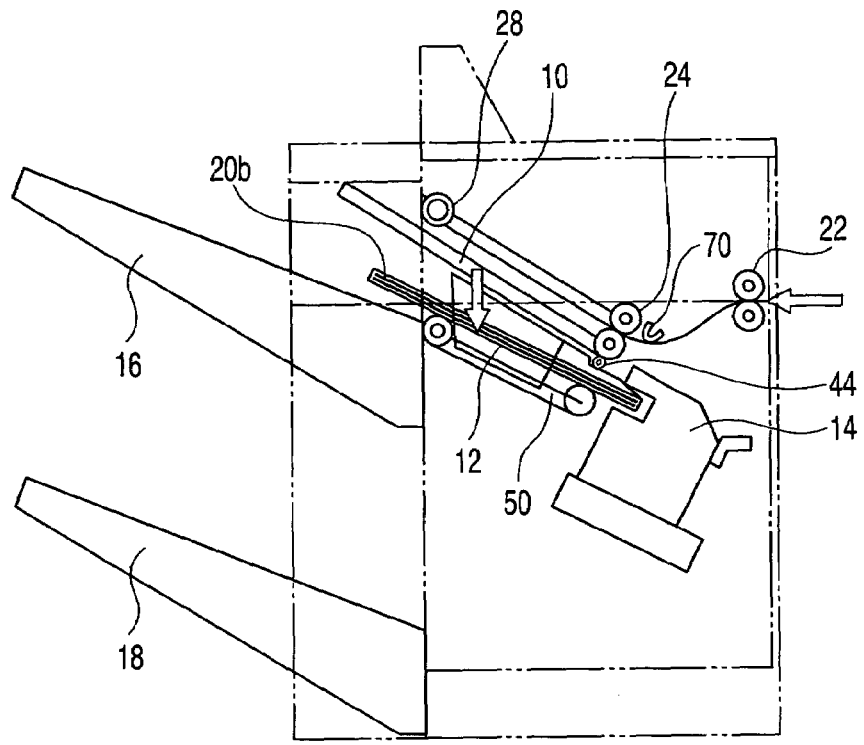
FIG. 12 is a view illustrating an operation of an active drop in the post-process apparatus showing one embodiment of the invention.

As shown in FIG. 6, the stapler 14 is positioned by a staple drive unit 49, and staple processing is controlled.

Figure 21:
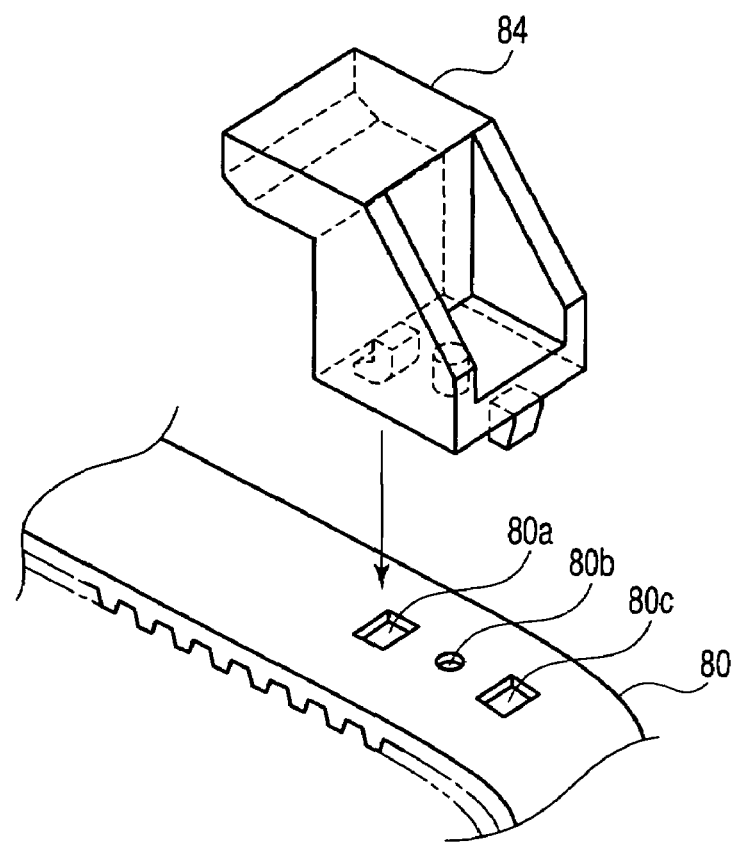
FIG. 21 is an illustrative view of a side view of the transport belt of the processing tray showing one embodiment of the present invention, the illustrative view showing a state in which the belt is to be mounted.
Figure 22:
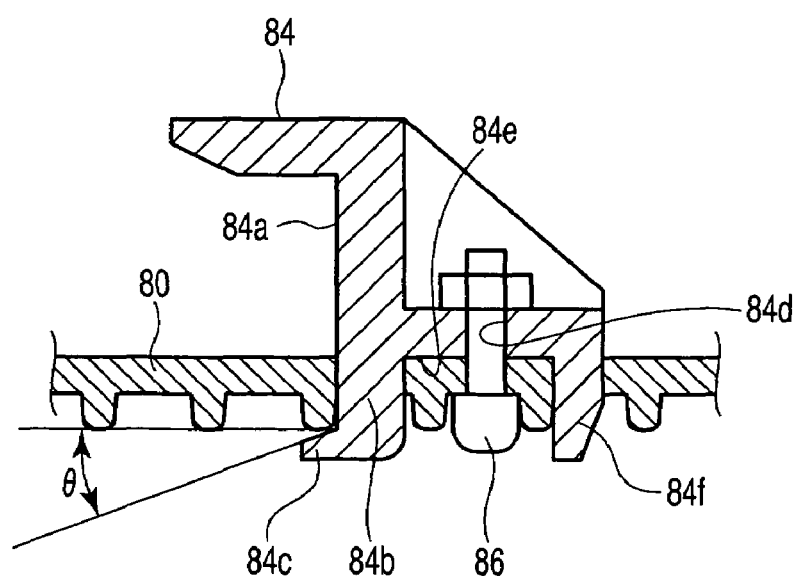
FIG. 22 is an illustrative sectional view of a side view of the transport belt of the processing tray showing one embodiment of the present invention, the sectional view showing a state in which the belt has been mounted.

Now, the transport mechanism 50 (shown in FIG. 4) will be described in detail with reference to FIGS. 19 to 23. The transport mechanism 50 comprises: a transport belt 80 and a pulley 82 for transporting a sheet; a push feed arm 84 mounted to be projected on a surface on the sheet transport side of the belt, the arm retaining a distal end of the sheet so that it can be pushed and fed; and a lock 86 for locking the push feed arm 84 to the belt. The transport belt 80 has first to third through holes 80a, 80b, and 80c, as shown in FIG. 21. On the other hand, the push feed arm 84, as shown in FIG. 22, comprises: a push feed face 84a for pushing and feeding a sheet distal end; a first penetrating projection portion 84b which reaches a transport belt lower face from this push feed face through the first through hole 80a of the arm; a hook shaped engagingly lock portion 84c engagingly locked on a belt lower face after bent from the first penetrating projection portion in the transport belt traveling direction; a mount face 84e coming into contact with the arm at a back side of the push feed face, the mount face having formed therein a through hole 84d which communicates with the second through hole of the belt; and a second penetrating projection portion 84f projected at the opposite side of the push feed face of this mount face, the second penetrating projection portion reaching the transport belt lower face through the third through hole 80c of the belt. The lock 86 locks the arm mount face to the belt through the through hole 84a of the arm and the second through hole 80b of the belt. In this example, the pitch diameter of the belt pulley is defined in the range of about 15 degrees to 20 degrees. In this case, a face of the hook shaped engagingly lock portion on a side which comes into contact with the belt lower face is inclined in the downward direction at an angle of 10 degrees to 30 degrees while the belt longitudinal direction is defined as a reference (angle θ).

<Storage Tray>

As shown in FIG. 4, the staple processed bundles of sheets are sent to the storage tray 16 by the transport mechanism 50. Selection of the storage tray 16 or 18 is made by vertically moving the storage tray 16 or 18 by a storage tray drive unit 52.

In the case where sheets are directly ejected from the waiting tray 10, the storage tray is risen up to a location which corresponds to a sheet outlet of the waiting tray.

(Description of Operation)

Now, an operation of the post-process apparatus according to the present invention will be described with reference to FIGS. 7 to 18.

<Operation in Case where Staple Processing is Carried Out>

As has been already described, staple processing on the processing tray is slow as compared with that on the image processing apparatus. Thus, when a sheet transported from the image processing apparatus is processed on the processing tray, a buffer unit is provided at the front stage thereof. Then, it is necessary to make a next sheet standby not so as to be transported to the processing tray until the staple processing on the processing tray has completed. In this example, a description will be given with respect to a case in which two sheets (first and second sheets) are made standby on the waiting tray, and the third and subsequent sheets are not required to be made standby.

A first sheet from the image processing apparatus is transported to the waiting tray 10 via the inlet roller 22 and the paper feed roller 24. The sheet is retained by left and right lower face support members 10a and 10b and the distal end support member which are set at the first position; the waiting tray roller 28 is lowered, and a sheet distal end is aligned (this alignment is made with the distal end 60 (upstream side) of the waiting tray 10).

Next, the waiting tray roller 28 is risen, and is ready for accepting a second sheet 20a. When the second sheet 20a is sent to the waiting tray 10, the waiting tray roller 28 is lowered to align a location of the sheet with the distal end 60 of the waiting tray 10. Then, the waiting tray roller 28 is risen (FIG. 11). When the second sheet is transported to the waiting tray, the distal end portion of the sheet is sensed by the sheet sensor 70. Based on this sense signal, the first and second sheets are dropped onto the processing tray 12 altogether. That is, the left and right lower face support members 10a and 10b are opened to be located at the second position or third position so as to release support of both sides of the sheet.

Then, with respect to the third and subsequent sheets, the waiting tray is kept in a state in which the support of the sheet is released, and the sheet is transported from the paper feed roller 24 directly to the waiting tray.

Figure 13:
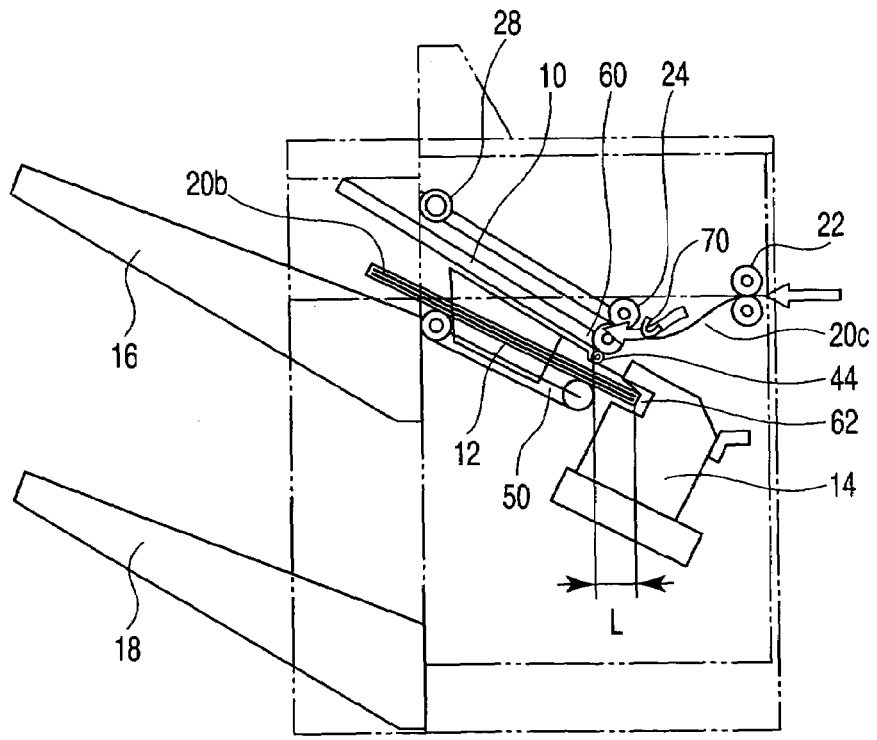
FIG. 13 is a view illustrating a flow of a third sheet of sheets in the post-process apparatus showing one embodiment of the invention.

A state in which the second sheet is held on the processing tray 12 will be first described. In the processing tray 12, a predetermined number of bundles of sheets 21 are formed to be held on two bundles of sheets 20b. At this time, the longitudinal and transverse alignment mechanisms 38 and 47 function, and longitudinal and transverse sheet alignments are executed. At this time, as shown in FIG. 13, the distal end 60 of the waiting tray 10 and a distal end (upstream side) 62 of the processing tray 12 are spaced in a transverse direction with a distance L so that the distal end 60 of the waiting tray 10 exists on the downstream side more than the distal end 62 of the processing tray 12. With such a construction, the bundle of sheets 20b can be easily dropped from the waiting tray 10 to the processing tray 12, and an aligning operation using the longitudinal and transverse alignment mechanisms 38 and 47 can be easily made. As a result, an occurrence of jamming can be prevented.

The processing tray 12 is allocated to be obliquely inclined together with the waiting tray 10. Thus, the distal ends 60 and 62 of the respective trays are located at the lowest position, and the sheet 20 and the bundle of sheets 21 can be aligned with the distal ends 60 and 62 by its own weight of the sheet 20 and the bundle of sheets 21.

Figure 14:
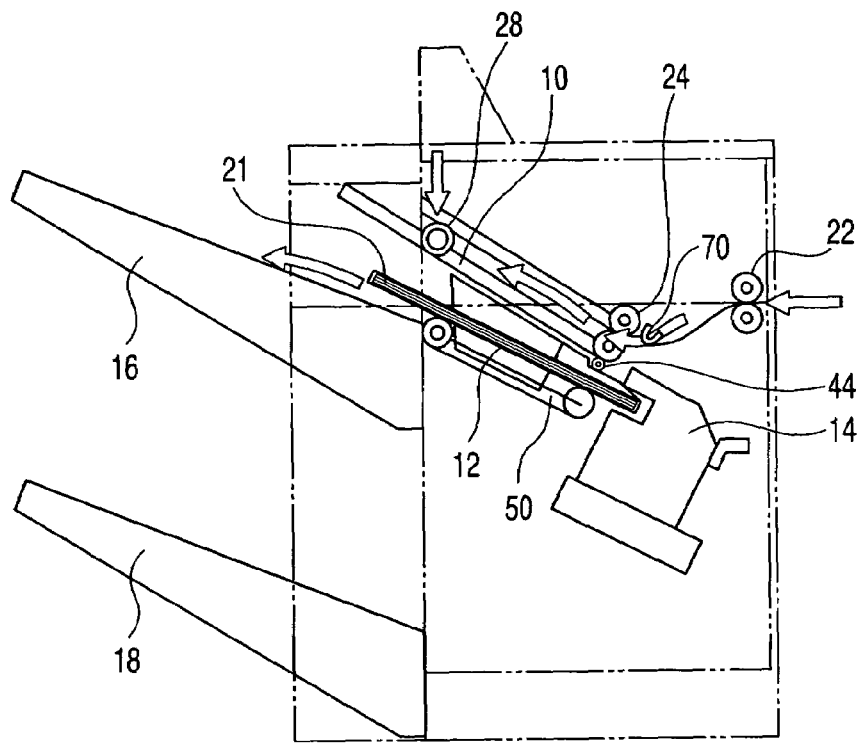
FIG. 14 is a view illustrating an operation of a stapler in the post-process apparatus showing one embodiment of the invention.
Figure 15:
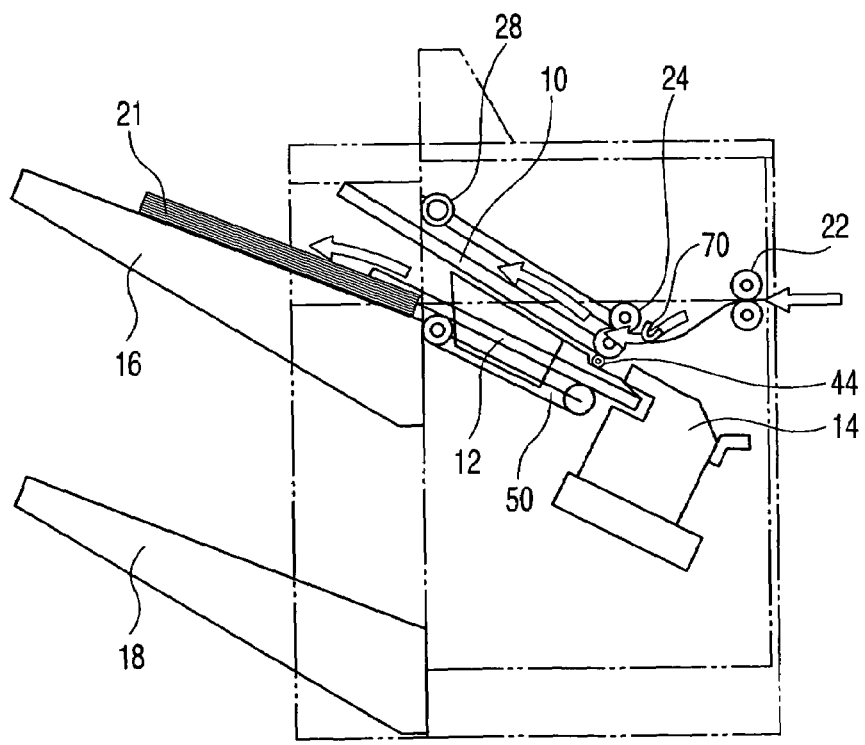
FIG. 15 is a view illustrating a flow of a bundle of sheets between a processing tray and a storage tray in the post-process apparatus showing one embodiment of the invention.
Figure 23:
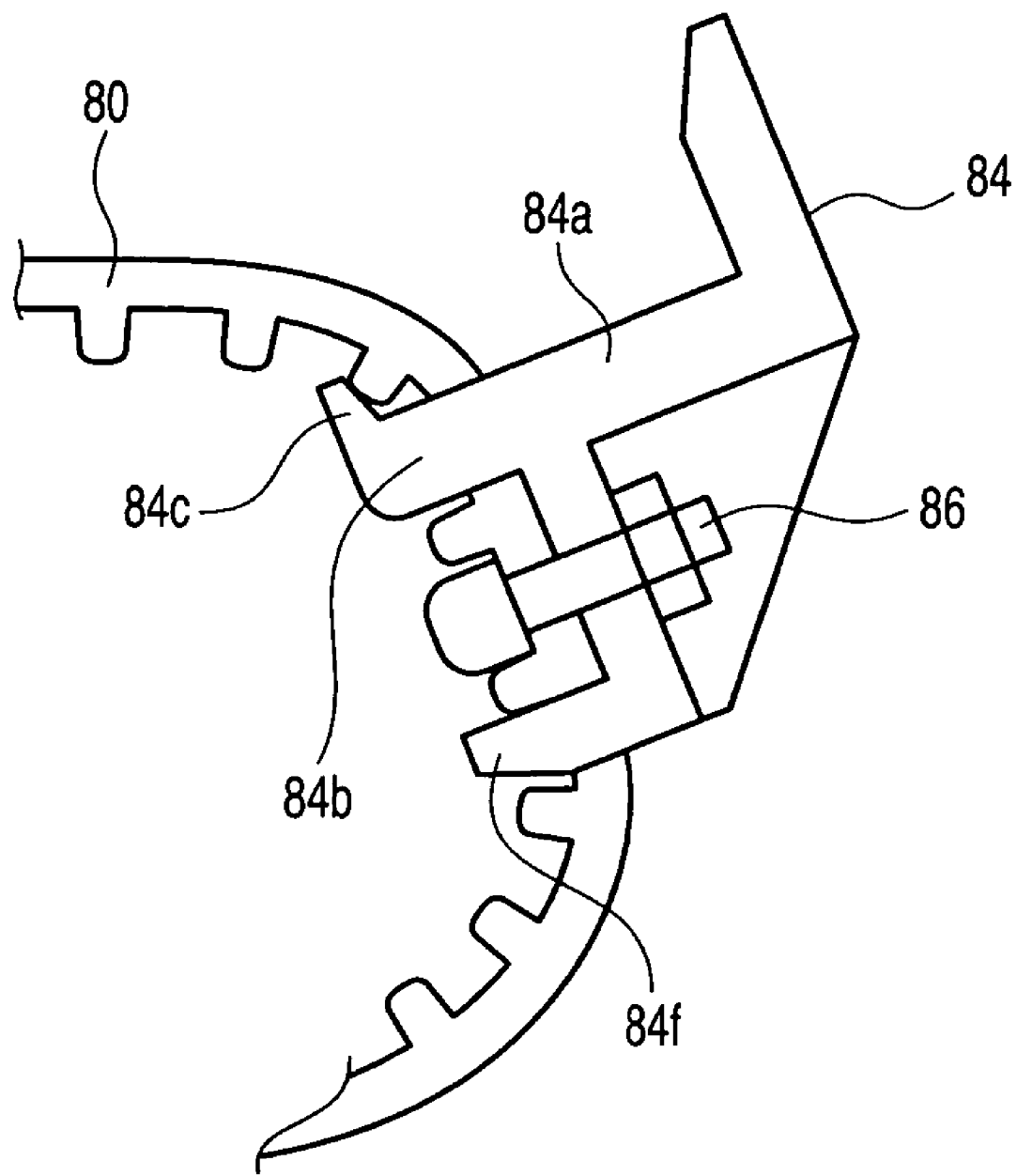
FIG. 23 is an illustrative view of a side view of the transport belt of the processing tray showing one embodiment of the present invention, the illustrative view showing a state in which a push feed arm is located at a portion along a radius of a pulley.

Next, as shown in FIG. 14, the bundle of sheets 21 is staple processed by the stapler 14. Then, as shown in FIG. 15, the bundle of sheets 20 is fed to the storage tray 16 by the transport mechanism 50. Then, as shown in FIG. 22, on the arm 84, the penetrating projection 84b is allocated through the belt 80. Thus, by this penetrating projection 84b, the sheets are prevented from being cut into the distal end push feed face. Therefore, the sheet distal end can be reliably fed to the storage tray 16 without being hooked on a weir between the arm 84 and the belt. In addition, the proximal end of the penetrating projection is formed in a hook shape (hook shaped engagingly lock portion 84c). Thus, the distal end push feed face 84a is not floated from the belt, and the penetrating projection does not slip off from the belt. Moreover, this hook shaped engagingly lock portion 84c is provided to be inclined in a downward direction while the belt traveling direction is defined as a reference. For example, this engaging lock portion is inclined downwardly at an angle of 10 degrees to 30 degrees. Thus, as shown in FIG. 23, even in the case where the arm 84 is located at a portion along the radius of a pulley, a load does not increase, enabling natural rotation. Therefore, there is no danger that the second penetrating projection portion 84f of the arm slips off from the belt 80. In this manner, even if the belt and arm are structured independently without being integrally structured, the sheet can be prevented from being cut into the distal end push feed face.

<Operation in Case where No Post-Process is Required>

Figure 16:
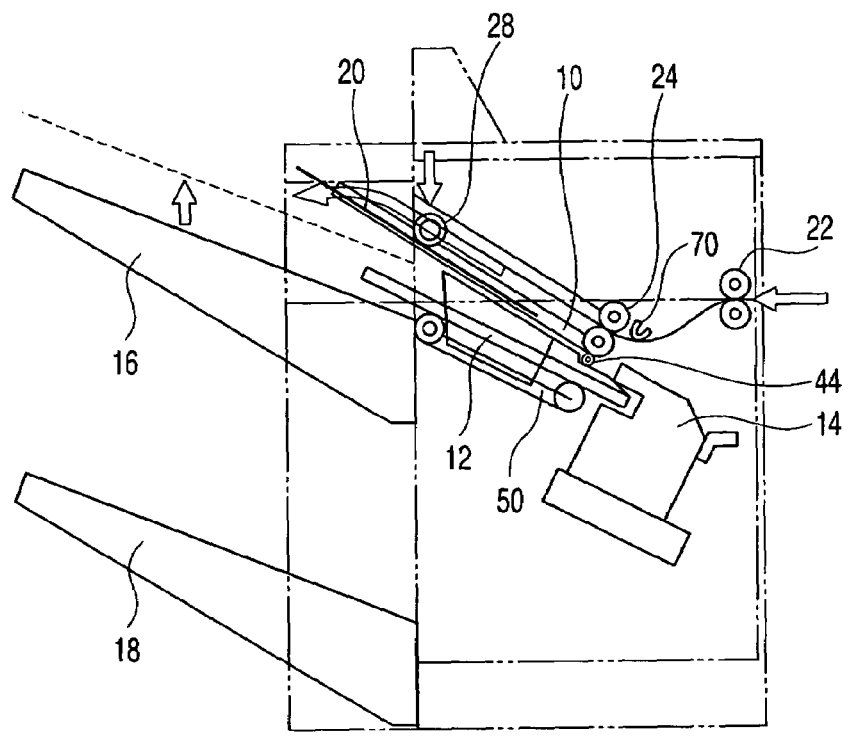
FIG. 16 is a view illustrating a flow of direct sheet ejection of a sheet from the waiting tray to the storage tray in the post-process apparatus showing one embodiment of the invention.
Figure 17:
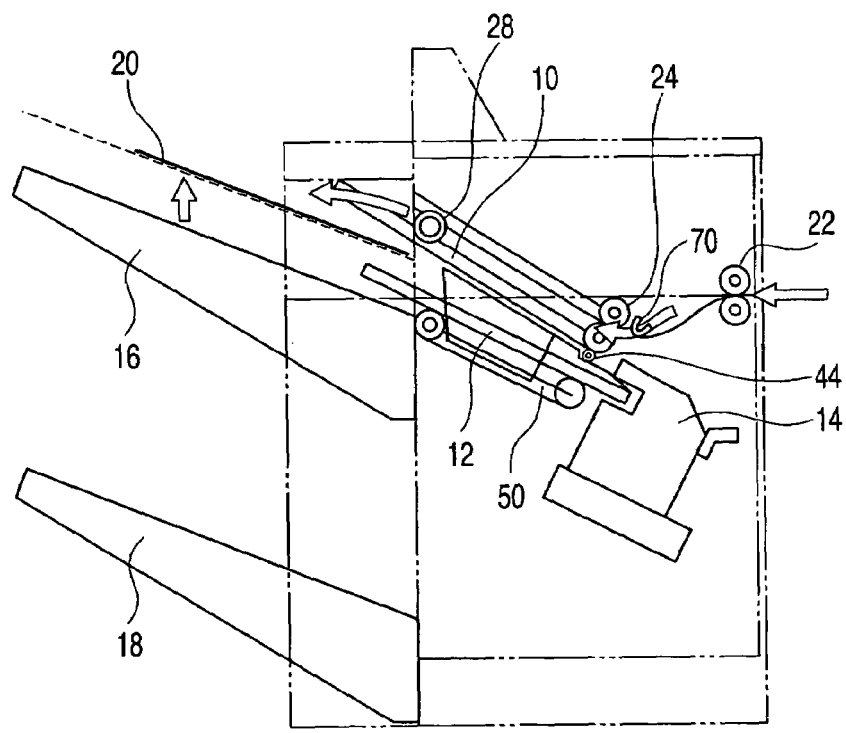
FIG. 17 is a view illustrating an operation of a position change of the storage tray in the post-process apparatus showing one embodiment of the invention.

In the case where no post-process is carried out (such as a case in which no staple processing is carried out or a case in which jamming occurs), as shown in FIGS. 16 and 17, a sheet is ejected from the waiting tray 10 directly to the storage tray 16 without intervening the processing tray 12. As shown in FIG. 16, the sheet fed from the image processing apparatus is fed to the storage tray 16 via the inlet roller 22, the paper feed roller 24, and the waiting tray 10. The waiting tray roller 28 is lowered to transport the sheet 20. The storage tray 16, as shown in FIG. 17, is slightly risen by the storage tray drive unit 52 to receive the sheet fed from the waiting tray 10.

Although the embodiments of the present invention have been described above, the present invention is not limited to the embodiments. Constituent elements shown in the embodiments can be changed to other constituent elements as long as they have same functions.

What is claimed is:

1. A sheet post-process apparatus, the apparatus comprising:
    a waiting tray which temporarily retains a transported sheet and releases the sheet;
    a processing tray which bundles the sheets dropped from the waiting tray to carry out predetermined processing and ejects the bundled sheets; and
    a storage tray which holds the bundle of sheets processed and ejected on the processing tray,
    wherein the processing tray comprises:
        a transport belt which transports the bundle of sheets; and
        a push feed arm mounted to be projected onto a surface on a sheet transport side of the transport belt, the push feed arm retaining a sheet distal end of the bundle of sheets so that the sheet distal end can be pushed and fed;
    wherein the transport belt forms a through hole through which the push feed arm penetrates, and
    the push feed arm comprises:
        a push feed face which pushes and feeds the sheet distal end;
        a penetrating projection portion which reaches a transport belt lower face from the push feed face through the through hole; and
        a hook shaped engagingly lock portion, formed integrally with the penetrating projection portion, engagingly locked on the transport belt lower face and being bent in the transport belt traveling direction, and
    wherein a face of the hook shaped engagingly lock portion on a side which comes into contact with the belt lower face is inclined in a downward direction at an angle of 10 degrees to 30 degrees while a longitudinal direction of the transport belt is defined as a reference.

2. The post-process apparatus according to claim 1, wherein the transport belt is provided around a pulley for transporting the bundle of sheets.

3. The post-process apparatus according to claim 2, wherein a pitch diameter of the transport belt and pulley is in a range of about 15 degrees to 20 degrees.

4. The post-process apparatus according to claim 1, further comprising a lock which locks the push feed arm to the transport belt.

5. The post-process apparatus according to claim 1, further comprising inlet rollers for conveying the transported sheet.

6. A processing tray of a post-process apparatus, comprising:
    a transport belt which transports a bundle of sheets; and
    a push feed arm mounted to be projected onto a surface on a sheet transport side of the transport belt, the push feed arm retaining a sheet distal end of the bundle of sheets so that the sheet distal end can be pushed and fed;

wherein the transport belt forms a through hole through which the push feed arm penetrates, and the push feed arm comprises:
- a push feed face which pushes and feeds the sheet distal end;
- a penetrating projection portion which reaches a transport belt lower face from the push feed face through the through hole; and
- a hook shaped engagingly lock portion, formed integrally with the penetrating projection portion, engagingly locked on the transport belt lower face and being bent in the transport belt traveling direction; and wherein a face of the hook shaped engagingly lock portion on a side which comes into contact with the belt lower face is inclined in a downward direction at an angle of 10 degrees to 30 degrees while a longitudinal direction of the transport belt is defined as a reference.

7. The processing tray for a post-process apparatus according to claim 6, wherein the transport belt is provided around a pulley for transporting the bundle of sheets.

8. The processing tray for a post-process apparatus according to claim 7, wherein a pitch diameter of the transport belt and pulley is in a range of about 15 degrees to 20 degrees.

9. The processing tray for a post-process apparatus according to claim 6, further comprising a lock which locks the push feed arm to the transport belt.

\* \* \* \* \*